United States Patent
Haseltine

(10) Patent No.: US 9,690,373 B2
(45) Date of Patent: Jun. 27, 2017

(54) MAKING PHYSICAL OBJECTS APPEAR TO BE MOVING FROM THE PHYSICAL WORLD INTO THE VIRTUAL WORLD

(71) Applicant: Disney Enterprises, Inc., Burbank, CA (US)

(72) Inventor: Eric Haseltine, Silver Spring, MD (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/678,945

(22) Filed: Apr. 4, 2015

(65) Prior Publication Data

US 2015/0209664 A1 Jul. 30, 2015

Related U.S. Application Data

(63) Continuation of application No. PCT/US2013/063544, filed on Oct. 4, 2013.
(Continued)

(51) Int. Cl.
*A63F 13/24* (2014.01)
*G06F 3/01* (2006.01)
*A63F 13/00* (2014.01)
*A63F 13/213* (2014.01)
*A63F 13/53* (2014.01)
(Continued)

(52) U.S. Cl.
CPC ............ *G06F 3/011* (2013.01); *A63F 13/00* (2013.01); *A63F 13/211* (2014.09); *A63F 13/213* (2014.09); *A63F 13/215* (2014.09); *A63F 13/216* (2014.09); *A63F 13/24* (2014.09); *A63F 13/53* (2014.09); *G06F 3/048* (2013.01)

(58) Field of Classification Search
CPC ...... A63F 13/24; A63F 13/211; A63F 13/213; A63F 13/215–13/216
See application file for complete search history.

(56) References Cited

U.S. PATENT DOCUMENTS 6,377,277 B1 * 4/2002 Yamamoto ............. A63F 13/10
345/629
2004/0119662 A1 * 6/2004 Dempski ............... G01S 3/7864
345/8
(Continued)

OTHER PUBLICATIONS

International Search Report for PCT/US2013/063544, Mar. 3, 2014.

*Primary Examiner* — David L Lewis
*Assistant Examiner* — Shauna-Kay Hall
(74) *Attorney, Agent, or Firm* — Patterson + Sheridan, LLP

(57) ABSTRACT

Embodiments provide a system that includes a first interactive device and control logic configured to perform an operation. The operation includes receiving historical data describing historical interactions between a user and one or more interactive devices. Additionally, the operation includes configuring the first interactive device with one or more interactive events. Each interactive event includes a respective (i) stimulus event and (ii) an action to perform responsive to an occurrence of the stimulus event, and at least one of the one or more interactive events is based on the received historical data. Responsive to detecting an occurrence of a first one of the one or more stimulus events, the operation includes causing the first interactive device to perform the corresponding action. The operation also includes updating the first interactive device with a second one or more interactive events.

11 Claims, 20 Drawing Sheets

Related U.S. Application Data

(60) Provisional application No. 61/709,969, filed on Oct. 4, 2012.

(51) Int. Cl.
*A63F 13/211* (2014.01)
*A63F 13/215* (2014.01)
*A63F 13/216* (2014.01)
*G06F 3/048* (2013.01)

(56) References Cited

U.S. PATENT DOCUMENTS

| | | | |
|---|---|---|---|
| 2006/0223635 A1* | 10/2006 | Rosenberg | A63F 13/10 463/37 |
| 2008/0235581 A1 | 9/2008 | Caporale et al. | |
| 2008/0316324 A1* | 12/2008 | Rofougaran | G01S 13/426 348/222.1 |
| 2010/0203933 A1* | 8/2010 | Eyzaguirre | A63H 13/10 463/2 |
| 2011/0101120 A1* | 5/2011 | O'Connor | A63H 18/028 238/10 A |
| 2012/0122570 A1* | 5/2012 | Baronoff | A63F 13/216 463/31 |
| 2012/0157197 A1* | 6/2012 | Watkins, Jr. | G06Q 10/00 463/30 |
| 2012/0157206 A1* | 6/2012 | Crevin | A63F 13/04 463/36 |
| 2012/0190446 A1 | 7/2012 | Rogers | |
| 2012/0322342 A1* | 12/2012 | De La Torre | A63H 18/06 446/444 |
| 2013/0052906 A1* | 2/2013 | Payne | A63H 18/02 446/14 |

\* cited by examiner

MAKING PHYSICAL OBJECTS APPEAR TO BE MOVING FROM THE PHYSICAL WORLD INTO THE VIRTUAL WORLD

CROSS-REFERENCE TO RELATED APPLICATION

This application is a continuation of PCT/US2013/063544 filed Oct. 4, 2013, which claims benefit of U.S. provisional patent application Ser. No. 61/709,969, filed Oct. 4, 2012, which is herein incorporated by reference in its entirety.

BACKGROUND

Field of the Invention

The present disclosure generally relates to home entertainment, and more specifically to techniques for providing an immersive environment using interactive objects.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

While video games may allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment provides a system that includes a first interactive device and control logic configured to perform an operation. The operation includes receiving historical data describing historical interactions between a user and one or more interactive devices. Additionally, the operation includes configuring the first interactive device with one or more interactive events. Each interactive event includes a respective (i) stimulus event and (ii) an action to perform responsive to an occurrence of the stimulus event, and at least one of the one or more interactive events is based on the received historical data. Responsive to detecting an occurrence of a first one of the one or more stimulus events, the operation includes causing the first interactive device to perform the corresponding action. The operation also includes updating the first interactive device with a second one or more interactive events.

Another embodiment provides a method that includes monitoring a position of a physical object to detect when the physical object reaches a predefined location within a physical environment, where the physical object is moving in a first direction and at a first speed within the physical environment. The method further includes, upon detecting the physical object has reached the predefined location, causing a virtual depiction of the physical object to appear within a virtual world, such that the virtual depiction of the physical object is moving in the first direction and at the first speed within the virtual world.

Still another embodiment provides a method that includes monitoring a position of a virtual object to detect when the virtual object reaches a predefined location within a virtual world, where the virtual object is moving in a first direction and at a first speed within the virtual world. The method also includes, upon detecting the virtual object has reached the predefined location, causing a physical object to begin moving in the first direction and at the first speed within a physical environment.

Yet another embodiment provides an apparatus that includes an enclosure having a one-way mirrored portion, the one-way mirrored portion comprising an exterior side that is mirrored and an interior side that is transparent. The apparatus further includes a display device disposed within the enclosure, the display device having a viewable portion configured to exhibit an image that is visible through the one-way mirror portion. Additionally, the apparatus includes a speaker device disposed within the enclosure and a camera sensor configured to capture an image and to convert the captured image into an electronic signal. The apparatus further includes a microphone device configured to capture audio and to convert the captured audio into audio data and a network adapter configured to receive and transmit network data. Moreover, the apparatus includes encoder logic configured to encode images captured from the camera sensor into video data, to encode the audio data captured from the microphone device, and to transmit the video data and the encoded audio data using the network adapter for display on a remote device; and decoder logic configured to decode audio data and video data received from the remote device over the network adapter, where the decoded video data is output for display using the display device and where the decoded audio data is audibly output using the speaker device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
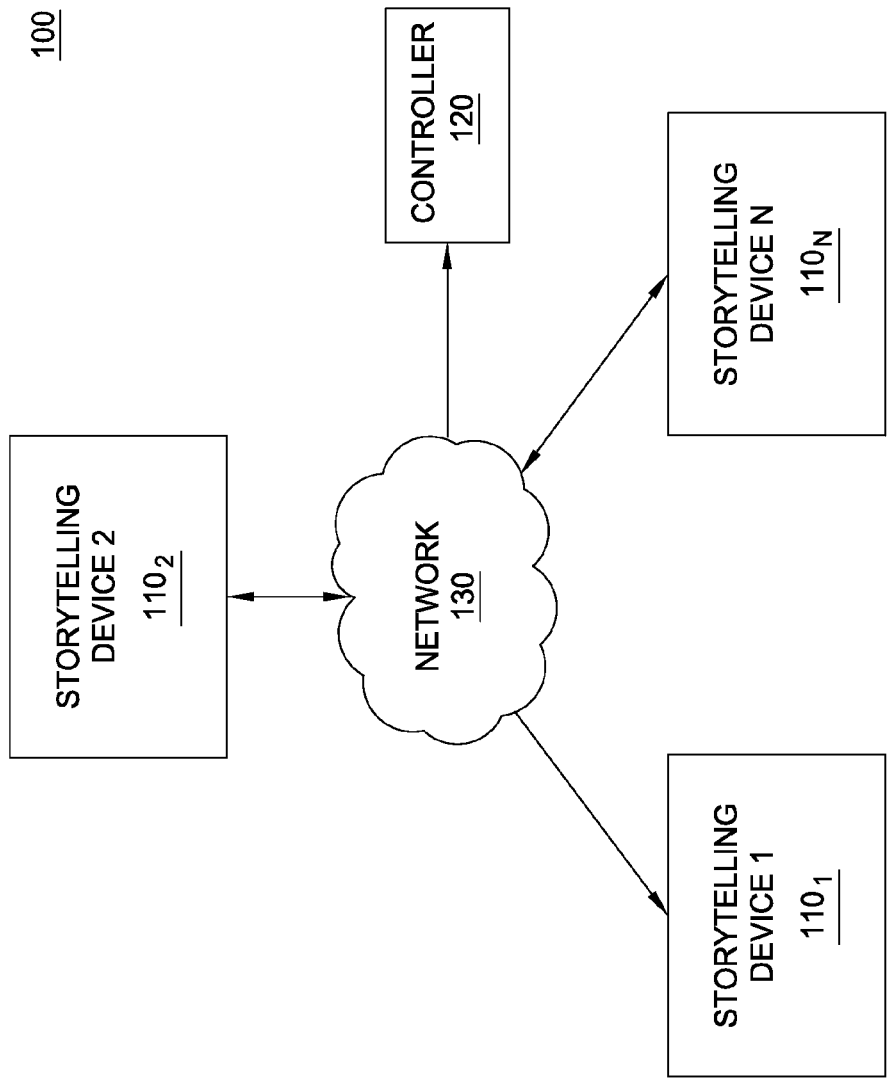
FIG. 1 is a block diagram illustrating a storytelling environment including a plurality of storytelling devices, according to one embodiment described herein.
Figure 2:
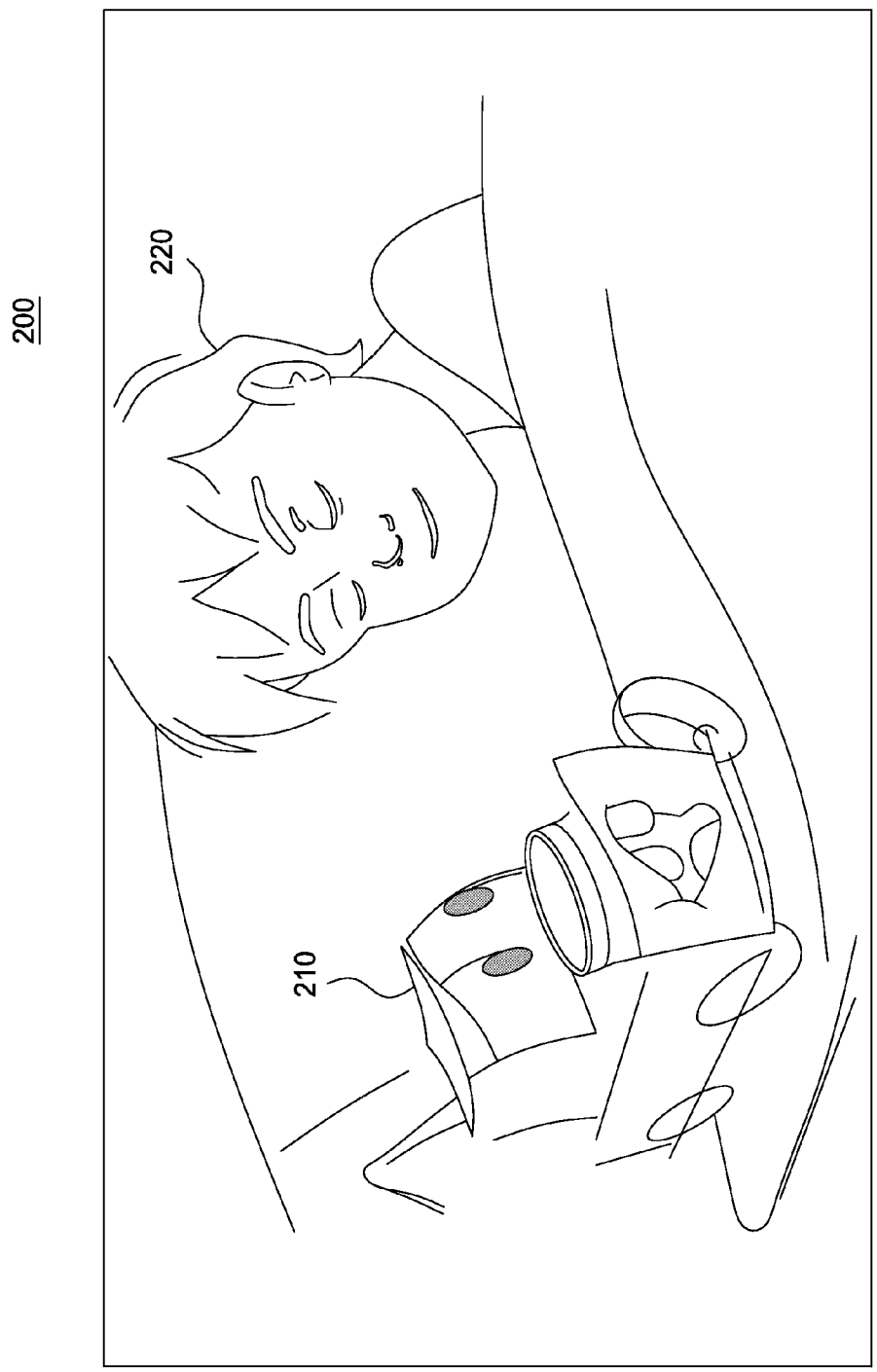
FIG. 2 is a screenshot illustrating a toy car interactive device interacting with a sleeping user, according to one embodiment described herein.

Embodiments generally provide immersive experiences for users using interactive objects. Interactive objects may be stateful objects capable of reacting in a contextually appropriate manner to user actions and real world scenarios.

As used herein, an interactive object may be referred to as a "storytelling object" or a "storytelling device", when the interactive object is participating in a storytelling experience. Such interactive objects may maintain data on their current surroundings, including what room (or type of room) they are in (e.g., bedroom, living room, etc.), which users are in the immediate area, which other objects (interactive or otherwise) are in the immediate area, characteristics of their current environment (e.g., are the lights on or off, is music playing, etc.) and so on. Interactive objects may also maintain historical data characterizing previous interactions with users and other objects. Such historical data may relate to user preferences, interactions with a specific user, interactions with other interactive objects, user behavior and so on.

The interactive objects may then use this data to perform contextually appropriate actions. For example, assume that a young child is playing with an interactive toy car object. Upon determining that music is playing loudly in the current environment and that the time is currently 9:00 pm, the interactive toy car could speak (e.g., using one or more speakers and a text-to-speech synthesizer) and suggest that the child turn the volume of the music down because it's time to get ready for bed. As another example, the interactive toy car could maintain user preferences data, based on previous interactions with the user. For instance, assume that the toy car, in carrying a conversation with the child, asked the child what his favorite food is and the boy replied "I love lasagna!" In a subsequent conversation with the child a few weeks later, the toy car could detect the child's mother calling the boy to come eat dinner. Based on the historical preference data, the toy car could then comment to the child "I sure hope we are having lasagna tonight!"

Additionally, the interactive objects may interact with other interactive objects to provide an immersive experience for the user. For example, assume that the child has purchased two interactive toy cars, based on the Pixar® movie Cars®: a Mater car and a McQueen car. Each of the toy cars could be configured to maintain historical data as well as environmental data, and could perform contextually appropriate actions based on the data. In one embodiment, the cars could collect data and report the data back to a controller component. The controller component could then direct the actions of the toy cars in a contextually appropriate manner.

Throughout their interactions with the user, the toy cars could use various techniques to learn the various rooms of the house, and could use this historical data to maintain an approximate floor print of the house. For instance, the cars could track their positions within the house using GPS coordinates. Additionally, the cars could use environmental characteristics to determine what type of room they are in. As an example, a toy car could be configured with a microphone and upon detecting the sound of running water within a particular room (e.g., the sound of someone drawing a bath), the toy car could determine that the particular room is a bathroom. As another example, the toy car could be configured with one or more cameras, and upon determining that an image taken of a certain room contains a bed, the toy car could determine that the room is a bedroom. As yet another example, an interactive object could determine the type of a particular room based on interactions with the user. For instance, the toy car could follow the child as he walks into the den, and could ask the child "Wow, what's this room for?" If the child then replies "This is my father's reading room," the toy car could store this data for use in subsequent interactions with the user.

The cars could then use this environmental map data in performing contextually appropriate actions. For instance, assume that the child's mother comes into his room while the child is playing with the two toy cars, and says "Billy, it's almost time for dinner. Mater, McQueen, make sure he washes his hands before dinner!" Upon detecting the mother's instructions, the toy cars (and/or the controller) could determine their current location within the house (e.g., using GPS data and historical map data determined from previous interactions). For instance, the toy cars could determine that they are currently located in Billy's bedroom, and could access the maintained historical location data describing their previous locations within the house to identify the nearest bathroom. The McQueen car could then say (e.g., using one or more speakers on the toy car and a text-to-speech synthesizer), in a voice consistent with the McQueen character in the movie Cars®, "Come on, Billy, let's go!" and could race off towards the bathroom. The Mater car could then say "Dadgummit, slow down McQueen, no racin' in the hallways!" and could drive alongside Billy as they make their way to the bathroom. In the bathroom, as Billy washes his hands, Mater could tell a story about the last time he got a car wash.

When the cars determine that Billy has finished washing his hands (e.g., using a microphone to detect when the sound of running water ceases), the cars could again use their map data to determine a path to the dining room. Again, the McQueen car could race off towards the dining room, despite protests from Mater car about racing in the hallways. The toy cars could have additional interactions with one another on the way to the dining room. For instance, in his haste to get to the dining room, the McQueen car could "crash" into the wall in the hallway. The McQueen car could then say "Ouch, that hurt!" and could receive a lecture from the Mater car about how it's unsafe to race in the hallways. These interactions could continue until the cars and Billy arrive in the dining room.

In one embodiment, the interactive objects may be configured to interact with non-interactive objects. Such non-interactive objects could be completely passive objects (e.g., a bed) or could be data collecting objects. As an example, the Mater toy car could detect when Billy lays down upon his bed (e.g., using one or more cameras in the toy car and/or deployed within the room). The Mater car could then say to Billy, "Hey, Billy, could you help me up there? That's too high for me to jump!" As another example, Billy could purchase a Cars® toothbrush which is configured to collect data for use by the interactive objects. For instance, the toothbrush could communicate with a controller using Bluetooth® communications to report usage data. The controller could then use this usage data to determine when the child typically brushes his teeth (e.g., the time(s) of day) and how long he brushes for. The controller could then use this data to control the actions of the interactive objects.

For instance, assume that the controller determines, based on the collected usage data, that Billy brushes his teeth every night at approximately 9:00 pm. On the next night, at 8:59 pm, the controller could determine that Billy is currently playing a Cars® video game, and could instruct the McQueen toy car to say to Billy, "Hey Billy, let's pause the game—it's time to brush your teeth!". The McQueen car could then begin moving towards the bathroom, encouraging Billy to follow him.

In addition to speech and movement, the appearance of the interactive objects may change depending on their context. For instance, continuing the above example, when the controller determines it's time for Billy to brush his teeth, the controller could instruct the Mater car to change the appearance of its buckteeth to a yellowish color. For instance, the buckteeth on the toy car could include a yellow light and a white light, and the yellow light could illuminate to give the teeth a yellowish appearance. As another example, each tooth could include an LCD display that changes from a pristine white tooth to a yellowish, dirty tooth responsive to the controller's instruction.

In this example, the Mater car could say "Hey Billy, after you brush your tooth, could you help me out here?" A special car toothbrush object could be provided (e.g., purchased separately or included with the toy car), and when the child moves the car toothbrush over Mater's buckteeth, the appearance of the teeth could change from the yellowish color back to a pristine white color (e.g., a yellow light could be deactivated within the teeth, a white light could be activated inside the teeth instead of the yellow light, the LCD display could turn off or display a white tooth, etc.). In one embodiment, the Mater car could instruct Billy to finish brushing his teeth first, before he cleans Mater's teeth. For instance, the Mater car (and/or the controller) could receive data from Billy's data-reporting toothbrush and could determine when Billy finishes brushing his teeth. In one embodiment, the Mater car could ensure that Billy brushes his teeth for a minimum amount of time, before allowing the child to clean up Mater's teeth.

In the following text, a first section describes how interactive objects can relate to a storytelling experience. Additionally, a following section then describes examples of particular interactive objects within and outside of a storytelling experience. The present disclosure also discusses a particular embodiment of an interactive object (i.e., a magic mirror interactive object), as well as techniques for managing virtual and physical world interactions.

Storytelling Devices

Additionally, embodiments provide techniques for creating an immersive environment using one or more storytelling devices. More specifically, embodiments may use various storytelling devices, each capable of producing some auditory and/or visual effect, to create an immersive and interactive experience for a user. To this end, the magic mirror device could participate in a storytelling experience, as one of the storytelling devices.

More generally, an example of a storytelling environment can be seen in FIG. 1, which is a block diagram illustrating a storytelling environment including a plurality of storytelling devices. The system 100 includes a plurality of storytelling devices $110_{1-N}$ and a controller 120, interconnected via a network 130. Here, each of the storytelling devices $110_{1-N}$ generally represent any device that is capable of making a contribution to a storytelling experience, responsive to some form of stimulus and a current context of a story. For instance, the controller device 120 could configure each of the storytelling devices $110_{1-N}$ with stimulus and response information, based on a current context of a story. As an example, the controller device 120 could configure a particular storytelling device to take a certain audiovisual action responsive to a certain stimulus event (e.g., a user performing a particular action), and to perform another audiovisual action responsive to another stimulus event (e.g., the user not performing the particular action within a predefined window of time).

When a user indicates that he wishes to begin the immersive storytelling experience for a particular story, the controller device 120 could detect all the storytelling devices $110_{1-N}$ available in the user's physical environment (e.g., in the room of the user's house where the user is currently standing). Additionally, the controller device 120 could determine which of the available storytelling devices $110_{1-N}$ are compatible with the particular story. Once the compatible storytelling devices $110_{1-N}$ are identified, the controller device 120 could initiate the immersive storytelling experience for the user, using the identified storytelling devices $110_{1-N}$.

As mentioned above, the controller device 120 could configure each of the storytelling devices $110_{1-N}$ to perform certain actions in response to a detected stimulus event and a current context of the story being told. Here, the story may include a number of different contexts in a temporal order, and the playback of the story may advance from one context to the next until the last context is reached and the storytelling experience is complete. However, while the story may be linear in progression, this is not necessarily the case. For example, one embodiment provides a story having one or more branches, where the story can proceed down one of a plurality of different arcs. For instance, one of the arcs could be selected based on a selection algorithm (e.g., randomly selecting one of the arcs), a user's request (e.g., the user specifying which arc should be taken), the user's actions (e.g., the user manages to "rescue" one of the fictional characters in the story), the user's history of actions (e.g., whether the user is trending towards the "dark side" in a Star Wars® storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

For example, a storytelling device could be in the shape of a magic lamp, and the stimulus event could be a user action within a physical environment in which the storytelling device is located (e.g., a user rubbing a surface of the magic lamp device). As another example, the stimulus event could be an action performed by another one of the storytelling devices. To perform the action(s) responsive to the detected stimulus event, the magic lamp device could be configured to project (i.e., using one or more projectors within the lamp or otherwise present within the physical environment) a depiction of a genie above the lamp. For instance, the depiction could be a virtual or real image projection that creates the appearance (or illusion) of a real or holographic image existing in and interacting with the physical world. Additionally, the magic lamp device could include an auditory device(s) (e.g., a speaker, resonant cavities, etc.) capable of playing sounds. For instance, the magic lamp device could use the auditory device(s) to play sounds synchronized with the projection of the genie depicting the genie's voice.

As part of the storytelling experience, the storytelling devices $110_{1-N}$ may appear to interact with one another and the user, using various input/output components. Continuing the above example of a magic lamp device, the device could be configured with a vibration mechanism (e.g., a gear coupled to an off-center weight), such that the magic lamp could appear to shake while the genie is "locked" inside the lamp. The lamp could also include a touch-sensitive surface that could be used to detect when the user rubs on the lamp. As an example, the lamp could appear to shake and rattle on the table, and could play sound effects depicting the genie asking the user to "Let me out of here!" The lamp could then detect when the user rubs on the side of the lamp with the user's hand (i.e., an occurrence of a stimulus event) and, in response, could project the holographic depiction of the genie above the lamp. The holographic genie projection could then thank the user for freeing him from the lamp (i.e., an action performed responsive to the occurrence of the stimulus event), and the story could continue.

Throughout the storytelling experience, portions of the story may require some action by the user before the story will continue. As an example, the storytelling device could require that the user find a particular object (e.g., a magic talisman) before the story can continue. Such an object could be, for instance, a physical object that was previously hidden in the physical environment (e.g., by the user's parent or guardian) or could be a virtual object seen with an augmented reality device. The storytelling device (or a controller device) could determine the hidden object's real-world position within the physical environment, for example, by receiving global positioning system (GPS) corresponding to the hidden object (e.g., determined by and received directly from the hidden object itself, received from a controller device, etc.) and by determining GPS coordinates associated with the storytelling device. The storytelling device (or a controller device) could then use the two sets of GPS coordinates to determine the hidden object's position relative to the storytelling device. The storytelling device (or a controller device) could further determine the user's position relative to the storytelling device (e.g., using GPS coordinates associated with the user, based on images captured using one or more cameras of the storytelling device, etc.), and from these two relative positions, could determine the hidden object's position relative to the user. As the user gets closer to the object, the storytelling device (or a controller device) could monitor the user's position and provide guidance to help the user find the object. For instance, as the user gets closer to the object, the storytelling device could inform the user that the user is getting "hotter", and as the user gets further from the object, the storytelling device could inform the user that he is getting "colder."

In one embodiment, the user may be given a choice between multiple different actions, and the action the user chooses may influence the outcome of the story. That is, depending on which action the user chooses, the controller device 120 could configure the storytelling devices $110_{1-N}$ differently, based on a corresponding storyline arc of the story. In such an example, when advancing from one context of the story to the next, the controller device 120 could select one of a plurality of next contexts to advance to, based on the stimulus event detected. For instance, once the user finds the magic talisman, the genie could inform the user that the power of the talisman may be used to stop an evil plan of the story's antagonist, or that the talisman could be destroyed in order to stop the antagonist's plot. The user may then inform the genie (e.g., with a verbal statement detected with one or more microphones) of the user's choice, and the controller 120 could advance the story a next context corresponding to the user's choice and could configure the storytelling devices $110_{1-N}$ accordingly, allowing the remainder of the story to play out differently depending on the path chosen by the user.

Generally, the storytelling devices $110_{1-N}$ can interact visually with the user as part of the storytelling experience. For instance, using the example above of a magic lamp storytelling device, storytelling device could track the user's position (e.g., using one or more boresighted cameras within the device—i.e., a camera configured to view the area that a projector is configured to project onto) and could project the depiction of the genie (e.g., using image projection techniques creating the appearance of real or holographic images within the real world) such that the genie appears to follow the user around the room as the user searches for the magic talisman. The storytelling device could also use the user's position to cause the projected genie to face the user when speaking to the user, helping to enhance the realism of the storytelling experience. The genie could be rendered as exasperated or frustrated when the user gets further away from the hidden talisman, and could be rendered as encouraging or cheering the user on as the user gets closer to the talisman.

In one embodiment, one of the storytelling devices $110_{1-N}$ is configured with an audio device(s) capable of localized sound (i.e., sound that appears to emit from the storytelling device), non-localized sound (i.e., sound where it is difficult to determine the input direction), or both. Generally speaking, localized sound may come from speakers producing mid- and high-range frequencies, while non-localized sound may come from speakers producing low-range frequencies. More generally, it is broadly contemplated that any techniques, known or unknown, for producing localized sound and/or non-localized sound may be used consistent with the present disclosure.

Embodiments may use localized sound and non-localized sound (e.g., sounds of different frequencies) to create particular effects in the immersive storytelling environment. For instance, while the genie is "locked" in the lamp, the lamp device could project sound depicting the genie's voice using localized sound, so that the genie's voice appears to be coming from the lamp. On the other hand, when the user is invoking the power of the magic talisman, the lamp could project sound effects for the talisman using non-localized sound, so that the sound effects appear to be coming from all around the user. Advantageously, by altering the perceived location of the sound source, embodiments may create a more immersive and enhanced storytelling experience.

The storytelling device could then use the image and voice/sound recognition features to provide personalized, context-aware storytelling. Additionally, such recognition features can greatly simplify the user's task of setting up and maintaining the storytelling system. Such setup automation could be used to effectively render the setup of a complex, multi-element storytelling environment fun and simple for the user. For example, image recognition technology could be used in conjunction with geolocation systems to automatically tell the storytelling device to tailor the story content to a child's bedroom (e.g., versus the family room), obviating the need for a user to manually tell the storytelling device where it is located and what other storytelling devices are in the immediate environment.

Additionally, as discussed above, the storytelling devices $110_{1-N}$ may interact with one another in creating the immersive storytelling experience. For instance, the storytelling device $110_1$ could be a mechanized stuffed animal (e.g., a monkey) capable of performing gestures and other movements (as well as auditory expressions) in response to particular stimuli. For instance, the mechanized monkey stuffed animal $110_1$ could be capable of walking around using its legs (and potentially its arms as well), and could be capable of moving its arms, legs, head and torso in various ways, giving the appearance of various gestures and facial expressions. In the present example, the mechanized monkey device $110_1$ could track the user's movement around the physical environment (e.g., using one or more cameras) and could follow the user around the room as the user searches for the magic talisman. In doing so, the device $110_1$ and/or the controller device 120 could track the device's $110_1$ position as well as the position of the magic talisman device. The monkey stuffed animal $110_1$ could also be configured to perform actions responsive to detecting an occurrence of a stimulus event, in order to give hints to the user (e.g., upon detecting that the user has been searching for the hidden object for longer than a threshold amount of time). For instance, if after 20 seconds the user has not found the hidden talisman, the monkey stuffed animal $110_1$ could begin jumping up and down, pointing in the direction of the hidden talisman, and making noises to attract the attention of the user.

Generally, it is broadly contemplated that a storytelling device may react differently to a given stimulus event, based on a current context of the story, and the controller 120 may configure the storytelling devices $110_{1-N}$ to recognize different stimulus events and to perform different actions in response, as the story plays out. For instance, in the above example, the monkey stuffed animal device could be configured to react in fear of the genie when the genie first appears (i.e., a first stimulus event at a first context within the story). However, at a later point in the story where the genie comes to the user's aid, the monkey device could be configured to react gratefully (i.e., a second stimulus event at a second context within the story). As another example, the magic lamp storytelling device (e.g., the storytelling device $110_2$) could be configured to react in a particular way when the user first rubs the lamp (e.g., by displaying a holographic image of the genie appearing above the lamp), but could react in a different way (or not at all) in a different part of the story. Advantageously, doing so allows the storytelling devices to react in a realistic and expected fashion, depending on a current context of the story.

The controller 120 generally contains logic for managing the storytelling experience. This may include, for instance, managing the actions of the various storytelling devices $110_{1-N}$ and coordinating how the storytelling devices $110_{1-N}$ interact with one another and with the user based on the current context of the story. For instance, the controller 120 could transmit, to each of the storytelling devices $110_{1-N}$, data defining the actions and corresponding stimuli that the respective device should use as part of the storytelling experience. For instance, such data may specify, without limitation, one or more frames to project, where to project such frames, auditory sounds to play, a frequency at which to play the sounds (e.g., localized versus non-localized sound), and a movement action (e.g., walking, gesturing, vibrating, etc.). In such an embodiment, each storytelling devices $110_{1-N}$ could only contain data relating to its own individual actions, rather than the entirety of the story and the actions and stimuli involved in the story. The devices $110_{1-N}$ could then perform the specified actions in response to detecting the corresponding stimuli, thereby creating the immersive storytelling environment.

Generally, a variety of different stimuli (also referred to herein as stimulus events) may be used in accordance with embodiments described herein. For instance, one stimuli could be a visual stimuli detected using one or more cameras within a storytelling device 110. As an example, the storytelling device 110 could monitor a user's position as the user walks around the room by capturing different images of the room using several different cameras positioned at different angles. The storytelling device 110 could then make contextually-appropriate comments to the user, based on the user's determined position. For instance, as the user gets further away from a hidden object that the storytelling device 110 knows the location of (e.g., based on a comparison between a GPS coordinates received from the hidden object and GPS coordinates determined for the storytelling device 110), the storytelling device 110 could comment (e.g., by emitting sound from one or more speakers) that the user is getting "colder" in his search for the hidden object.

Another example of a stimulus is an action taken by another one of the storytelling devices 110. For instance, when the user rubs the magic lamp device and the projection of the genie appears, the monkey stuffed animal device could emit a frightened noise (e.g., "Eek!") and could cover its eyes with its hands. The occurrence of the action by the other storytelling device 110 could be conveyed in a number of ways. For instance, the monkey device could detect that the genie projection has appeared, by analyzing images captured using one or more cameras.

As another example, the magic lamp device could be configured to transmit a signal to the monkey device, indicating that the genie projection action has been performed. The monkey device could then react to the genie's appearance, based on the received signal. As discussed above, the action performed responsive to the detected stimulus event may depend on a current context of the story being told. That is, while the monkey device may react in fright when the genie first appears (i.e., a first context within the story), the monkey device may react in relief later in the story when the genie comes to the user's aid against the antagonist of the story (i.e., a second context within the story).

In a particular embodiment, rather than transmitting a signal directly to the other storytelling devices, the magic lamp device could transmit the signal to the controller 120, and the controller 120 could determine which, if any, other storytelling devices 110 need to be made aware of the occurrence of the event. That is, a centralized model could be employed where each storytelling device communicates with the controller 120, rather than a peer-to-peer model in which each storytelling device communicates directly with the other storytelling devices. For instance, the controller could maintain data specifying which storytelling devices 110 are capable (in the context of a given story) of reacting to a particular stimulus event. Upon receiving a signal indicating that a particular action has been performed, the controller 120 could use such data to determine which device(s) should react to the event and informs those device (s) of the occurrence of the event. In one embodiment, the controller 120 may select a subset of the devices capable of reacting to the event, and may inform only the selected devices of the occurrence of the event. For example, if the controller 120 determines that six different storytelling devices 110 present in the physical environment (e.g., the user's room) are capable of reacting to the appearance of the genie, the controller 120 may determine a subset of these devices to react to the genie's appearance. Such a subset could be selected, for instance, based on a priority value associated with each device's 110 response action to the stimuli. In one embodiment, the devices 110 to react to the stimuli are selected randomly (or pseudo-randomly).

The controller 120 may also determine, for each available device 110 capable of reacting to the event, whether the device 110 should perform the entirety of its responsive actions in reacting to the event. That is, the controller 120 could specify that certain available devices 110 should only perform a portion of their responsive actions, in response to the detected stimuli. For instance, assume that the controller 120 determines that there are six different storytelling devices 110 present in the physical environment that are capable of reacting to the appearance of the genie, and that all six devices 110 have both an auditory and a physical reaction to the genie's appearance. Here, the controller 120 could select a sub-set of the devices 110 (e.g., only the monkey device) to react in an auditory fashion, but could determine that all six of the devices 110 should perform their physical reaction to the genie's appearance. Advantageously, doing so helps to ensure that all available storytelling devices 110 capable of doing so will react to the stimuli in some form, while making sure that the storytelling devices 110 do not "talk over" each other, making each device's auditory contribution difficult to understand.

Generally, the controller 120 may be implemented in a number of different ways. In one embodiment, the controller 120 resides within one of the storytelling devices $110_{1-N}$. One advantage to such an embodiment is that no additional setup on the user's part may be required before the storytelling experience begins. That is, the user could purchase the storytelling device containing the controller 120, and when the user activates the storytelling device (e.g., by powering it on), the controller 120 could detect what other storytelling devices $110_{1-N}$ are present within the user's home (e.g., through wireless communications) and could automatically adapt the storytelling experience accordingly. However, from the user's experience, the user merely powers the device containing the controller 120 on and the story begins.

In a particular embodiment, the controller 120 comprises software executes on a computing device. For example, the user could download a software application on a personal computing device or tablet computing device that, when executed, serves as the controller 120. Such an embodiment may require the user to download or install a software application before beginning the storytelling experience. However, one advantage to using software on a personal computer as the controller 120 is that the software application can take advantage of the processing power of the user's personal computer, thereby avoiding any additional cost of adding separate controller logic to one of the storytelling devices $110_{1-N}$.

Generally, the controller 120 may maintain data related to a multitude of different stories. For each story, the controller 120 could maintain data specifying a list of storytelling devices 110 that are compatible with the story, and may maintain a respective set of actions and corresponding stimulus events for each compatible device. Additionally, some stories may include different branches, in which the story can play out in different ways depending on the choices a user makes and/or the actions the user takes.

For instance, the stories are provided to the controller 120 as they are released (e.g., the controller 120 could automatically download the newly released stories from a remote website). In a particular embodiment, stories associated with a particular storytelling device may be automatically unlocked when the user purchases and registers such a storytelling device with a content server. In one embodiment, the controller 120 is configured to download only stories that the user has purchased. For instance, the user could maintain an account with the remote story server (e.g., a website). If the user selects a given story for playback, the controller 120 could query the remote website to determine whether the user has already purchased the selected story, based on the user's account with the website. If the user has already purchased the story, the controller 120 could begin interactively telling the story using the available storytelling devices. If the user has not yet purchased the story, the controller 120 could prompt the user as to whether the user wishes to purchase the story.

In one embodiment, the controller 120 is configured to automatically purchase the story on the user's behalf when the user selects a story he has not yet purchased. In a particular embodiment, the stories are provided to the user using a subscription model. That is, the user could periodically pay a subscription fee (e.g., monthly) and new stories could be periodically released on the remote website. So long as the user's subscription is paid, the controller 120 could automatically download the new stories from the remote website, so that the new stories are ready for playback when the user next wishes to use the storytelling device(s).

In one embodiment, users may purchase alternate actions, behaviors and/or dialogue options for their storytelling devices. Generally, it is completed that any content associated with the storytelling experience may be locked or unlocked in various ways and for various reasons, consistent with the functionality herein. For instance, content (e.g., stories, behaviors, dialogue, etc.) may be unlocked based on the user's previous actions in the storytelling environment. For instance, in a Star Wars® themed storytelling environment, the controller 120 could unlock various Sith-themed stories if the user is trending towards the "dark side", based on the user's past actions in previously played stories.

More generally, it is contemplated that any revenue model, known or unknown, may be employed in the distribution of stories. Exemplary revenue models include, but are not limited to, a pay-per-use model (e.g., a fee is assessed each time the user plays through a story), a micropayment model (e.g., chapters within a single story could be purchased individually, special characters within a single story could be unlocked using digital currency, etc.), virtual good purchases (e.g., special items which influence the playback of a story could be unlocked, either with a purely virtual currency and/or a digital currency linked to real currency, etc.), advertising models (e.g., targeted product placement within the context of a given story, an advertisement depicted using visual and/or audible playback from a storytelling device(s), etc.) and a viral marketing model (e.g., a story could be unlocked for users who transmit advertising and/or purchasing opportunities to one another).

In one embodiment, a physical item can be used to unlock digital (and/or virtual) content. For instance, a plastic chip could be provided (e.g., for sale at retail stores) that is configured to plug into a particular slot on one of the storytelling devices. As an example, an electronic or electromechanical (e.g., a key with particularly arranged slots) could be plugged in to one of the storytelling devices to unlock content. The controller 120 could detect when the chip has been plugged into one of the storytelling devices and could further detect a type of the chip (e.g., based on data specified on a memory within the chip, based on the construction and/or shape of the chip, etc.). The controller 120 could then unlock content corresponding to the detected type for use by the user. For example, such content could include a new storyline that can be played out by the storytelling device having the chip, and the controller 120 could download such a storyline (e.g., from a remote server) responsive to the chip being inserted into the storytelling device. As another example, the unlocked content could include new behaviors and/or dialogue for the storytelling device. More generally, it is broadly contemplated that any content can be unlocked by the physical device, consistent with the functionality herein.

Additionally, the physical object or device need not plug into or otherwise physically connect with the storytelling device in order to unlock content. For example, the storytelling device could receive a signal (e.g., an RF or RFID signal) that indicates particular content should be unlocked. As an example, a signal could be broadcast at a particular Star Wars®-themed attraction at a theme park, and any Star Wars®-themed storytelling device receiving the signal could be configured to unlock particular content in response. As an example, a new storyline could be unlocked upon receipt of the signal. As another example, the storytelling device could perform certain actions (e.g., gestures, dialogue, etc.) in response to receiving the signal.

Moreover, it is broadly contemplated that stories may be provided by any number of parties. For example, in one embodiment, a single story developer controls the creation, production, and release of stories onto the market for the storytelling system. In another embodiment, a marketplace could be provided in which developers, retailers, users and hobbyists can work collectively to create and distribute custom stories to other various users. Such custom stories could be distributed free of charge or could be distributed using any pricing model, known or unknown, consistent with the present disclosure. Additionally, the marketplace could be moderated to ensure the distributed stories are content-appropriate. For example, moderators could assign ratings to individual stories (e.g., ratings similar to Motion Picture Association of America ratings for films) and users could be informed of these ratings before viewing a particular story. In such an embodiment, particular users (e.g., children) may be restricted from viewing stories with certain ratings. In one embodiment, moderators may only allow "approved" stories onto the market place. For instance, moderators could only approve youth-appropriate stories for distribution, thereby insuring that any and all content distributed on the marketplace is appropriate for users of all ages.

Generally speaking, the storytelling devices 110 and the controller 120 may be stateful devices. That is, these devices 110$_{1-N}$ and 120 may maintain state data relating to a current playback position within a given story, and this state data may be maintained when if the user suspends playback of the story. Thus, the user could pause the interactive playback of a particular story at some playback position (e.g., 20 minutes into the story), and when the user next initiates the playback of the particular story, the playback could resume at approximately the previous playback position (e.g., exactly at the previous playback position, slightly before the previous playback position, slightly after the previous playback position, etc.).

Additionally, such state data may specify particular events that have occurred (e.g., interactions with a user) and could be used to improve the storytelling experience for the user. For instance, a virtual character (e.g., projected into the physical world, shown on an augmented reality device, etc.) could be configured with a variety of different phrases that can be used in reacting to a given stimulus event. In such an embodiment, a storytelling device 110 associated with the virtual character could maintain state data specifying which of the phrases the virtual character has used recently, and could avoid using these recently used phrases in responding to subsequent occurrences of the stimulus event. Advantageously, doing so helps to ensure the dialogue between the virtual characters and the user is repetitive, and does not become stale or repetitive. Other state data could relate to, for example, customer relationship management (CRM) services and other personalization features, such as remembering the user's name, remembering the state of a room, remembering past activities and interactions occurring between a storytelling device(s) and a user(s), and likely or predicted future needs and desires for the user(s).

In one embodiment, an augmented reality device is used as one of the storytelling devices 110. As used herein, an augmented reality device refers to any device capable of displaying a real-time view of a physical, real-world environment or elements of a physical, real-world environment, while altering elements within the displayed view of the environment. As such, unlike a virtual reality device which displays a view of virtual world, an augmented reality device displays a view of the real world but augments elements using computer graphics technology. More generally, however, the augmented reality devices and the storytelling devices 110 can work to create a high-level form of augmented reality. For instance, by projecting images of virtual characters into the physical world to create the appearance of a three-dimensional holographic image, embodiments are able to augment the appearance of the physical world itself as perceived by the user, thereby creating a new form of augmented reality for the user.

For instance, continuing the aforementioned example of a user searching for a magic talisman hidden within his room, the user could search for the talisman using an augmented reality device. As an example, the user could walk around his room, viewing the room with the augmented reality device, and software on the augmented reality device could be configured to augment the displayed scene to include the augmented reality device, when a specific location of the user's room is viewed. Additionally, the depiction of the magic talisman on the display of the augmented reality device could appear to respond to interactions from the user. For instance, the augmented reality device could detect the appearance of the user's hand within captured visual scene (e.g., frames captured using a camera(s) of the augmented reality device) and could manipulated the appearance of the magic talisman within the display, such that it appears the user is touching and physically moving the virtual talisman. As an example, the user could reach out and grasp at the depicted location of the virtual talisman, and the augmented reality device could augment the depiction of the user's hand on the augmented reality device's display, such that it appears the user is holding the talisman in his hand. The user could then walk around his room carrying the talisman (as shown on the augmented reality device).

Interactive Devices

Particular embodiments provide immersive experiences using interactive objects. Interactive objects may be state-based objects capable of reacting in a contextually appropriate manner to user actions and real world scenarios. For instance, one embodiment provides a system that includes a first interactive device and control logic. Generally, the control logic can reside in any location communicatively connected to the first interactive device. For example, the control logic can execute on hardware within the first interactive device itself, within another interactive device, within a mobile device, within a remote system (e.g., within a cloud computing environment), and more generally on any hardware and/or software resources from which the control logic can communicate with the first interactive device.

The control logic could receive historical data describing historical interactions between a user and one or more interactive devices. The historical interactions may be between, e.g., the first interactive device and the user, another interactive device(s) and the user, and a combination therebetween. The control logic could then configure the first interactive device with one or more interactive events. Each interactive event could include a respective (i) stimulus event and (ii) an action to perform responsive to an occurrence of the stimulus event, and at least one of the one or more interactive events could be determined based on the received historical data. For example, a stimulus event of one of the interactive events could be determined based upon a historical pattern of behavior for the user. As another example, the action performed responsive to an occurrence of the stimulus event could be determined, based on historical interactions with the user.

Upon detecting an occurrence of a first one of the one or more stimulus events, the control logic could then cause the first interactive device to perform the corresponding action. Additionally, the control logic could update the first interactive device with an additional interactive event (e.g., replacing the interactive event whose stimulus event was detected). Doing so enables the interactive object to react to its environment in a contextually appropriate manner.

Generally, as used herein, an interactive object may be referred to as a "storytelling object" or a "storytelling device", when the interactive object is participating in a storytelling experience. Such interactive objects may maintain data on their current surroundings, including what room (or type of room) they are in (e.g., bedroom, living room, etc.), which users are in the immediate area, which other objects (interactive or otherwise) are in the immediate area, characteristics of their current environment (e.g., are the lights on or off, is music playing, etc.) and so on. Interactive objects may also maintain historical data characterizing previous interactions with users and other objects. Such historical data may relate to user preferences, interactions with a specific user, interactions with other interactive objects, user behavior and so on.

The interactive objects may then use this data to perform contextually appropriate actions. As shown, the screenshot 200 includes a Mater toy car 210 and a child 220. For purposes of the following examples, the child 220 may also be referred to as "Billy." Of note, in the following examples, various interactive objects may be described as making certain determinations and performing certain actions responsive to particular stimuli. However, it is broadly contemplated that the logic for making such determinations and performing the various actions may be contained within the interactive objects themselves, on a controller coupled to the interactive objects (e.g., using Bluetooth® communications), or a combination thereof.

Assume that the screenshot 200 depicts a scene occurring at 8:00 am, while the child 220 is still asleep. For example, the Mater toy car 210 could determine (e.g., based on historical interactions, based on explicit instructions from the child's parent or guardian, etc.) that it's time for the user 220 to wake up. As such, the Mater toy car 210 could say (e.g., using one or more speakers within the toy car interactive device 210 and a text-to-speech synthesizer), and in a voice that mimics the Mater character's voice from the movie Cars®, "Hey Billy, I reckon' it's time for you to get up! Rise and shine buddy!" In response, Billy 220 could say "Not yet Mater, let me sleep just a few more minutes." The toy car 210 could detect (e.g., using a microphone device) Billy's comment and could determine an appropriate reaction. For instance, if the toy car interactive device 210 determines that the current day is Saturday, the car 210 could say "Alright Billy, but don't sleep too long! We've got important things to do today!" On the other hand, if the toy car interactive device 210 determines it's Monday and further determines that Monday is a school day for Billy 220, the car 210 could say "No can do, buddy, it's time to get up and get ready!"

The car 210 could then determine, using one or more cameras within the car or positioned throughout the room, when the user 220 begins to get out of bed. In response, the Mater toy car interactive device 210 could say "Hey Billy, put me down on the ground and let's go! It's time to brush your teeth!" The car 210 could then detect when Billy 220 has placed the car 210 on the floor (e.g., using one or more cameras, by mapping data from an accelerometer within the car to a predetermined signature, etc.) and could then determine a path to the bathroom. For instance, as discussed above, the toy car 210 (and/or a controller device) could maintain map data describing various rooms of the house. The car 210 could determine its current position in the house (e.g., based upon the appearance of its environment detected using one or more cameras, based on its current GPS coordinates, etc.) and could determine a path to the bathroom where the user 220 brushes his teeth using the historical data.

Figure 3:
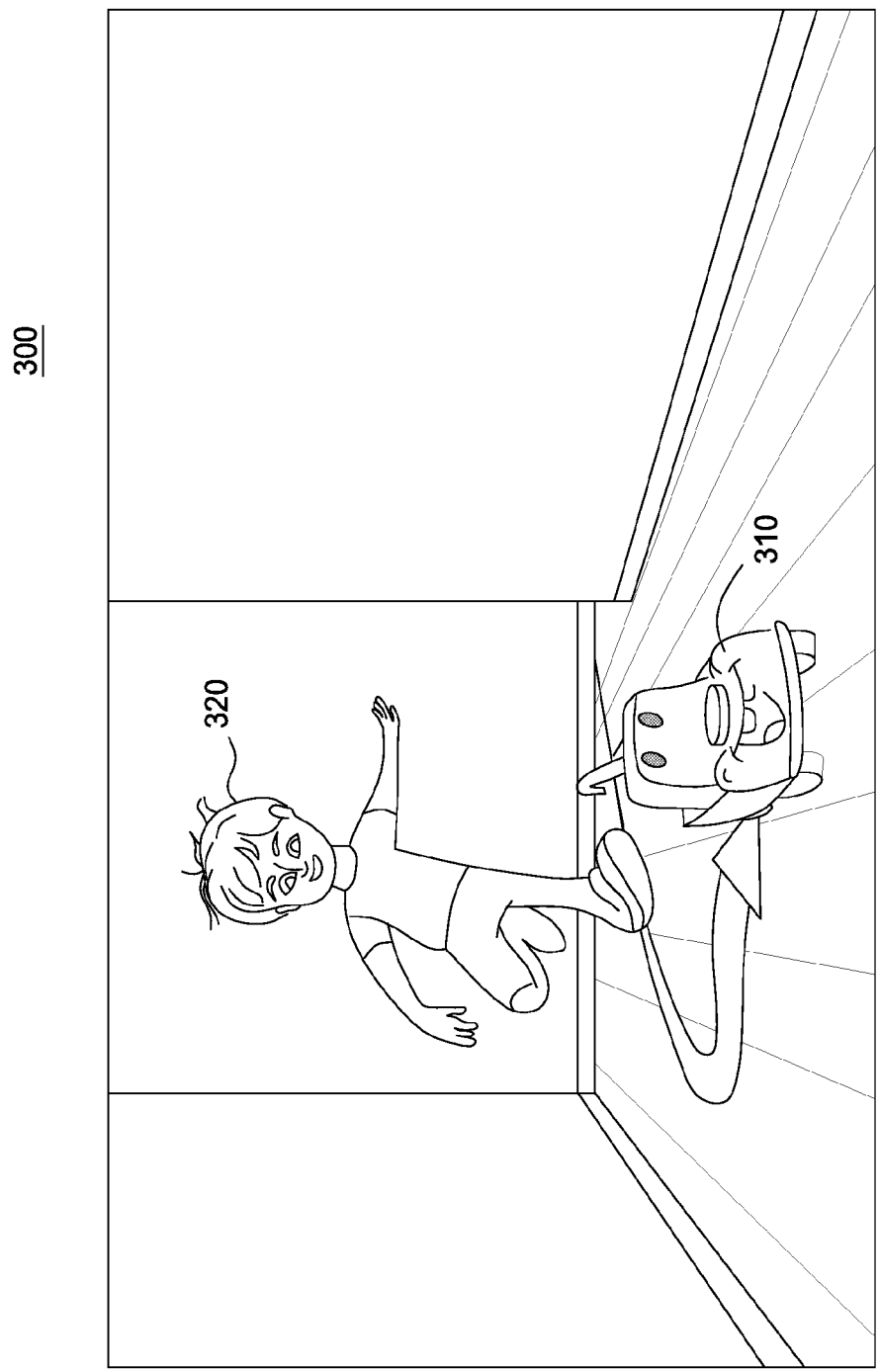
FIG. 3 is a screenshot illustrating the toy car interactive device interacting with a user, according to one embodiment described herein.

Once the car 210 determines the path, the car 210 could drive off towards the bathroom, saying "Let's go Billy, those teeth won't brush themselves!" A depiction of this is shown in FIG. 3, which is a screenshot illustrating the toy car interactive device interacting with a user, according to one embodiment described herein. In the screenshot 300, the Mater car 310 is shown as driving down the hallway towards the bathroom, with the user 320 following close behind. Here, the toy car interactive device 310 could monitor the user's 320 position (e.g., using one or more camera devices, using a signal received from an article worn by the user, etc.) and could adjust the movement of the toy car 310 to maintain a consistent distance relative to the user 320. For example, the toy car 310 could be configured to stay between three to five feet in front of the user 320, in moving towards the bathroom. If the user 320 stops along the way (e.g., to speak with someone in the house), the toy car 310 could detect this and could maintain its position relative to the user (e.g., by stopping moving altogether, by driving in circles, etc.).

Figure 4:
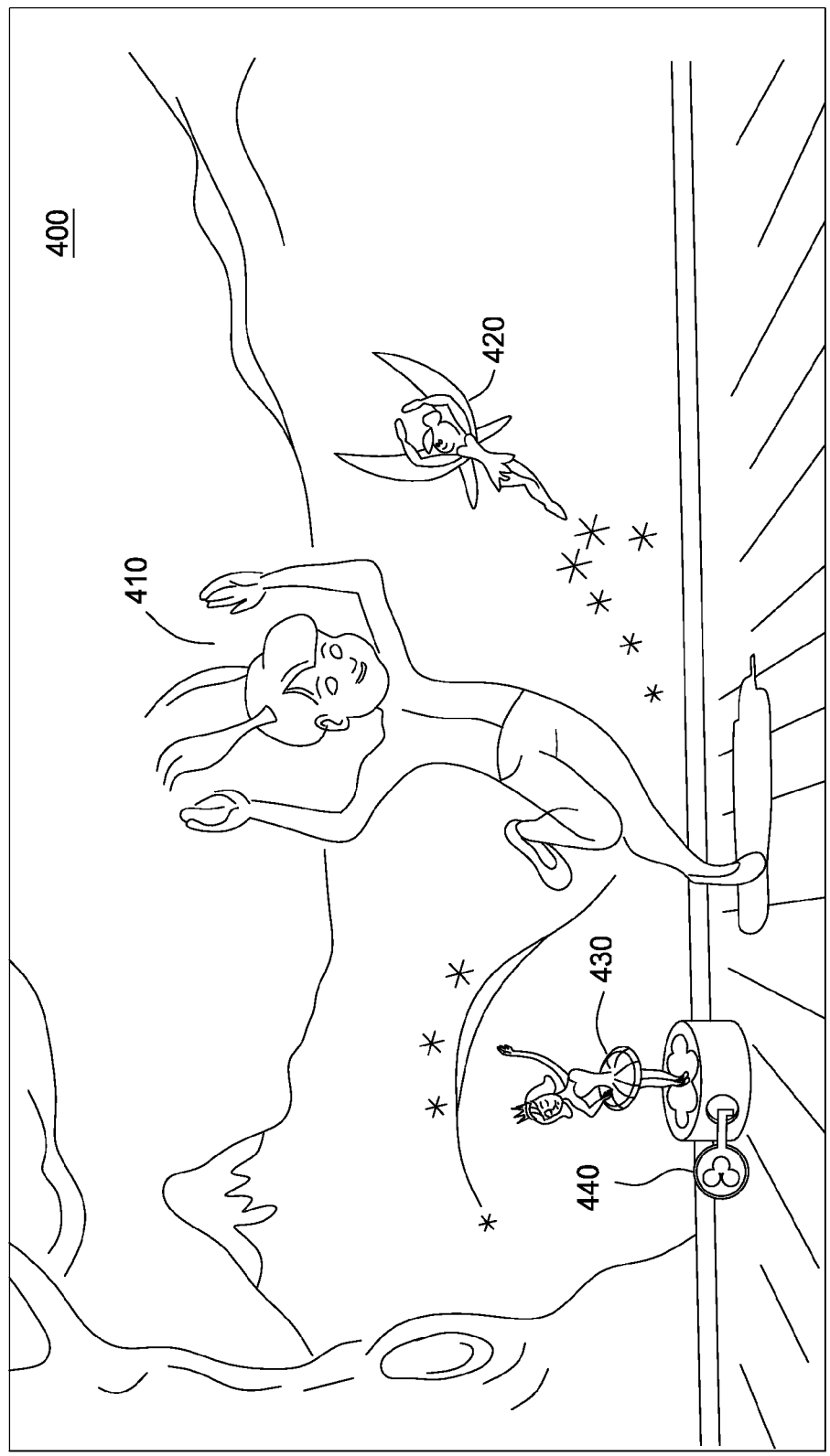
FIG. 4 is a screenshot illustrating a fairy interactive device interacting with a user, according to one embodiment described herein.

In addition to reacting to a user's actions, an interactive device could be configured to react to another interactive device. An example of this an interactive device is shown in FIG. 4, which is a screenshot illustrating a fairy interactive device interacting with a user, according to one embodiment described herein. As shown, the screenshot 400 depicts a user 410 (also referred to herein as "Susie"), a projected toy faerie 420, a music box interactive device 430 and a key interactive device 440. In this example, assume that Susie 410 has inserted the key device 440 into the music box device 430, in order to unlock additional functionality from the music box device 430. Here, upon detecting that the user 410 has inserted the key device 440 into the music box device 430 (i.e., an occurrence of a particular stimulus event), the music box device 430 could begin playing a new song that was unlocked through the use of the key 440 (i.e., a corresponding action performed responsive to the occurrence of the particular stimulus event).

Additionally, it is contemplated that more than one action can be performed by one or more interactive devices responsive to a single occurrence of a stimulus event. For example, as shown in the screenshot 400, in addition to playing the new song, a projector object (e.g., in the music box 1330, positioned within the room, etc.) has begun projecting a forest scene onto the wall behind the user 410 and is projecting an image of a faerie 420 flying through the air with pixie dust streaming behind. Additionally, the faerie image 420 could be projected such that it tracks the movements of the user 410. For example, the faerie image 420 could say (e.g., using one or more speakers positioned throughout the room) "Susie, it's time to come up with a new dance!" The projector object could then track Susie's movements (e.g., using one or more cameras) and could project the faerie image 420 in such a way that the faerie image 420 mimics the user's 410 movements. Thus, as the user 410 invents her new dance, the projected faerie 420 follows along, imitating the same dance steps and movements. Doing so provides an immersive play environment in which the interactive devices can respond to a user in real-time and in a contextually appropriate manner.

Figure 5:
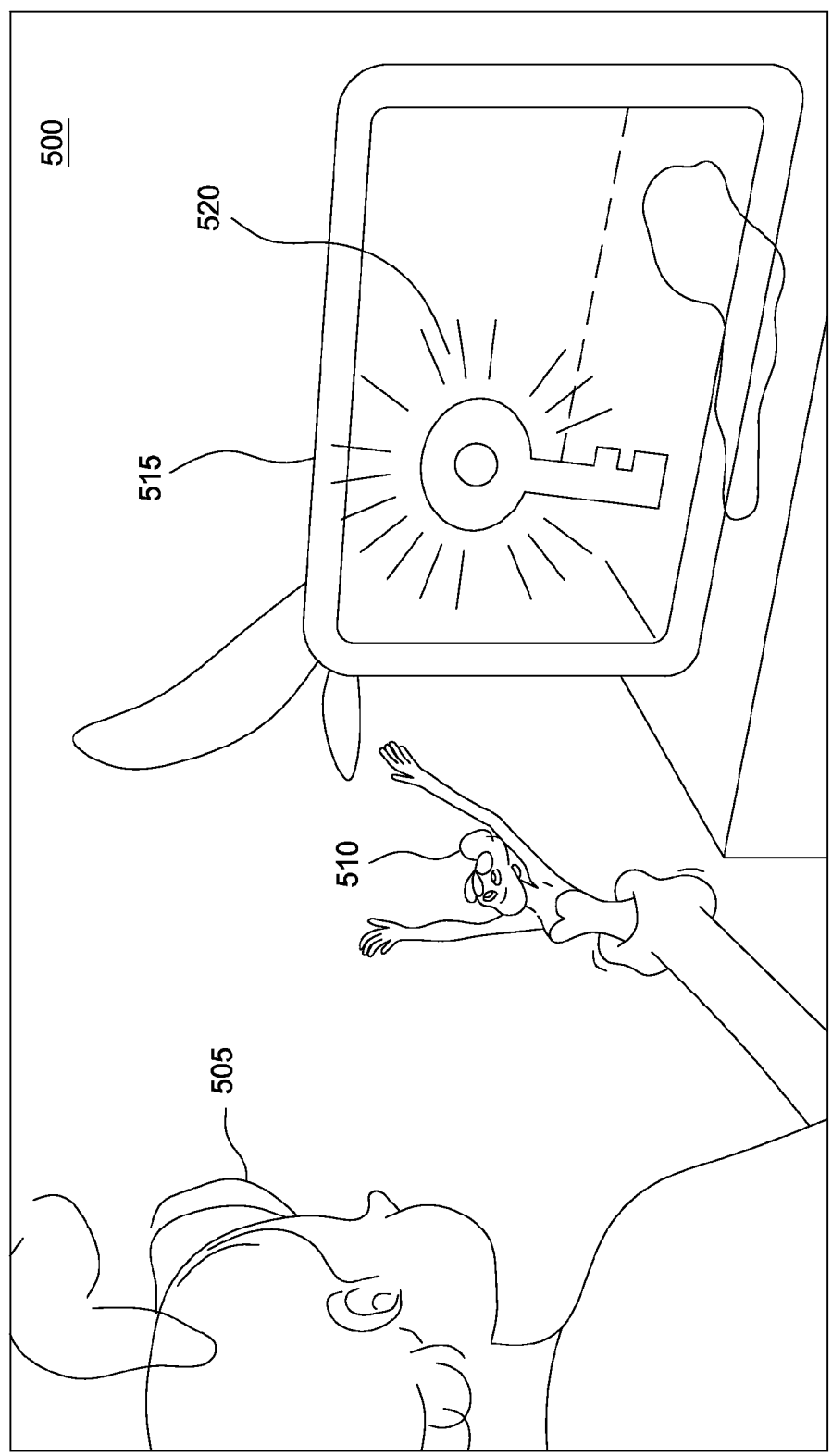
FIG. 5 is a screenshot illustrating the fairy interactive device interacting with a user and an augmented reality device, according to one embodiment described herein.

In addition to reacting to stimulus events involving a user and/or another physical interactive device, interactive devices can respond to stimulus events occurring in a virtual world or augmented reality space as well. Moreover, interactive devices can be configured to respond to occurrences of stimulus events through the use of actions within a virtual world or an augmented reality space. For instance, embodiments could be configured to reward a user with a particular virtual or augmented reality object for performing certain tasks. An example of this is shown in FIG. 5. Here, the screenshot 500 depicts a faerie toy interactive device 510, a user 505, and a display screen 515. Responsive to detecting an occurrence of a particular stimulus event, the faerie toy 510 could say, using one or more speaker devices: "Susie, it's time to unlock your reward! Give me a shake over the Faerie Frame to uncover your prize!" The child 505 could bring the faerie toy device 510 over to the display screen 515 (i.e., the Faerie Frame, in this example) and, upon detecting the user 505 shaking the toy 510 over the display device 515 (e.g., based on data received from an accelerometer within the toy 510), the display 515 could render frames depicting pixie dust falling from the faerie toy 510. For instance, the faerie toy 510 could include an accelerometer device capable of detecting when the child 505 is shaking the toy 510, and the faerie toy 510 could relay this accelerometer information, e.g., to a controller device or directly to the display screen 515.

Upon determining the child 505 is shaking the faerie toy 510 over the display screen 515 (i.e., an occurrence of a particular stimulus event), the display screen 515 could render frames depicting pixie dust falling from the faerie toy 510 (i.e., an action corresponding to the stimulus event). Once a sufficient amount of pixie dust is rendered, the display screen 515 could then render frames depicting a virtual key 520. The faerie toy 510 could then say "Congratulations Susie! I'm sure this key will come in handy in the future!" In such an example, the display screen 510 may communicate with a controller device to inform the controller device that the virtual key 520 has been displayed. The controller device, in turn, could communicate with the faerie toy 510, instructing the faerie toy 310 on one or more actions to take in response to the virtual key 520 being displayed.

In addition to displaying the virtual key 520, the display device 520 could enable the user 505 could interact with the virtual key 520 in various ways. For example, the user 505 could manipulate the virtual key using a touchscreen surface of the display device 520. In one embodiment, the user 505 could manipulate the key 520 in an augmented reality space. For example, the user 505 could reach behind the display 510 to grasp the key 520, and upon detecting the user's 505 hand has touched the virtual key 520 in the augmented reality space, the display device 510 could render one or more frames depicting the virtual key 520 moving in response to the user's touch.

In one embodiment, the virtual key 520 could be displayed using augmented reality glasses worn by the user 505. The user could then manipulate the virtual key 520 within the physical environment. For example, the user could grasp a position in the physical environment in which the virtual key is displayed, and the augmented reality glasses could then render a series of frames depicting the user's hand holding the virtual key. The user could then manipulate the virtual key by, e.g., inserting the virtual key into a key slot within a physical interactive device.

Figure 6:
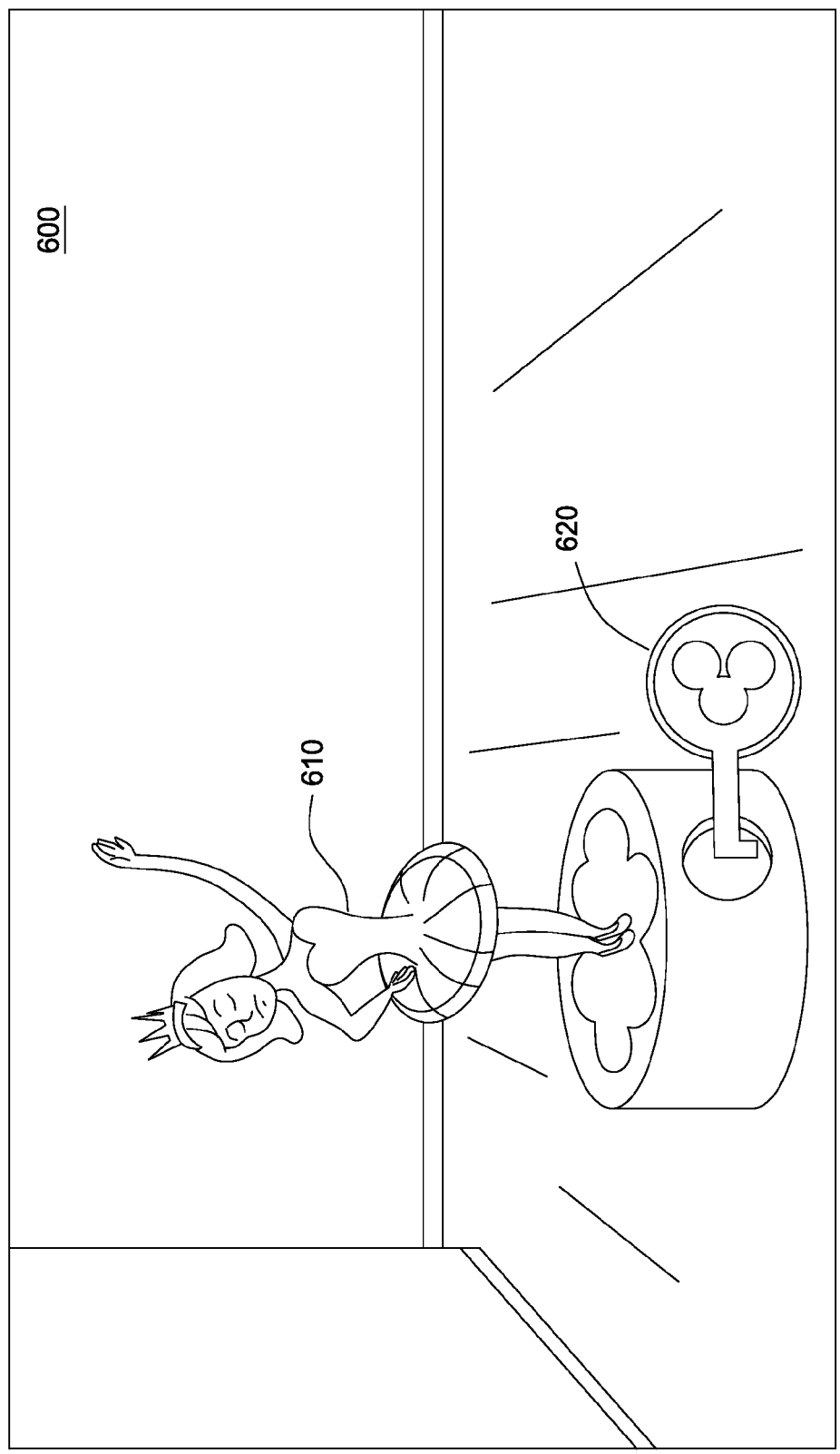
FIG. 6 is a screenshot illustrating the music box interactive device interacting with a virtual key, according to one embodiment described herein.

An example of this is shown in FIG. 6, which is a screenshot illustrating a music box interactive device interacting with a virtual key, according to one embodiment described herein. As shown, the screenshot 600 depicts a music box interactive device 610 with a virtual key 620 inserted within a key slot of the device 610. For example, the screenshot 600 could represent a frame within a series of frames rendered by an augmented reality device, e.g., a pair of augmented reality glasses. In one embodiment, the insertion of the virtual key 620 within the music box 610 could represent an occurrence of a stimulus event, and the music box 610 (and/or another interactive device) could be configured to perform a corresponding action(s) in response. For example, upon detecting the virtual key 620 has been inserted, logic within the music box 610 could activate one or more lights within the music box device 610, and could cause one or more speaker device within the music box 610 to play a particular song. Additionally, the logic could engage a motor within the music box device 610, causing the figurine portion of the device 610 to rotate. Doing so allows the interactive devices to not only react to physical stimulus events, but to react to virtual and augmented reality events as well.

Figure 7:
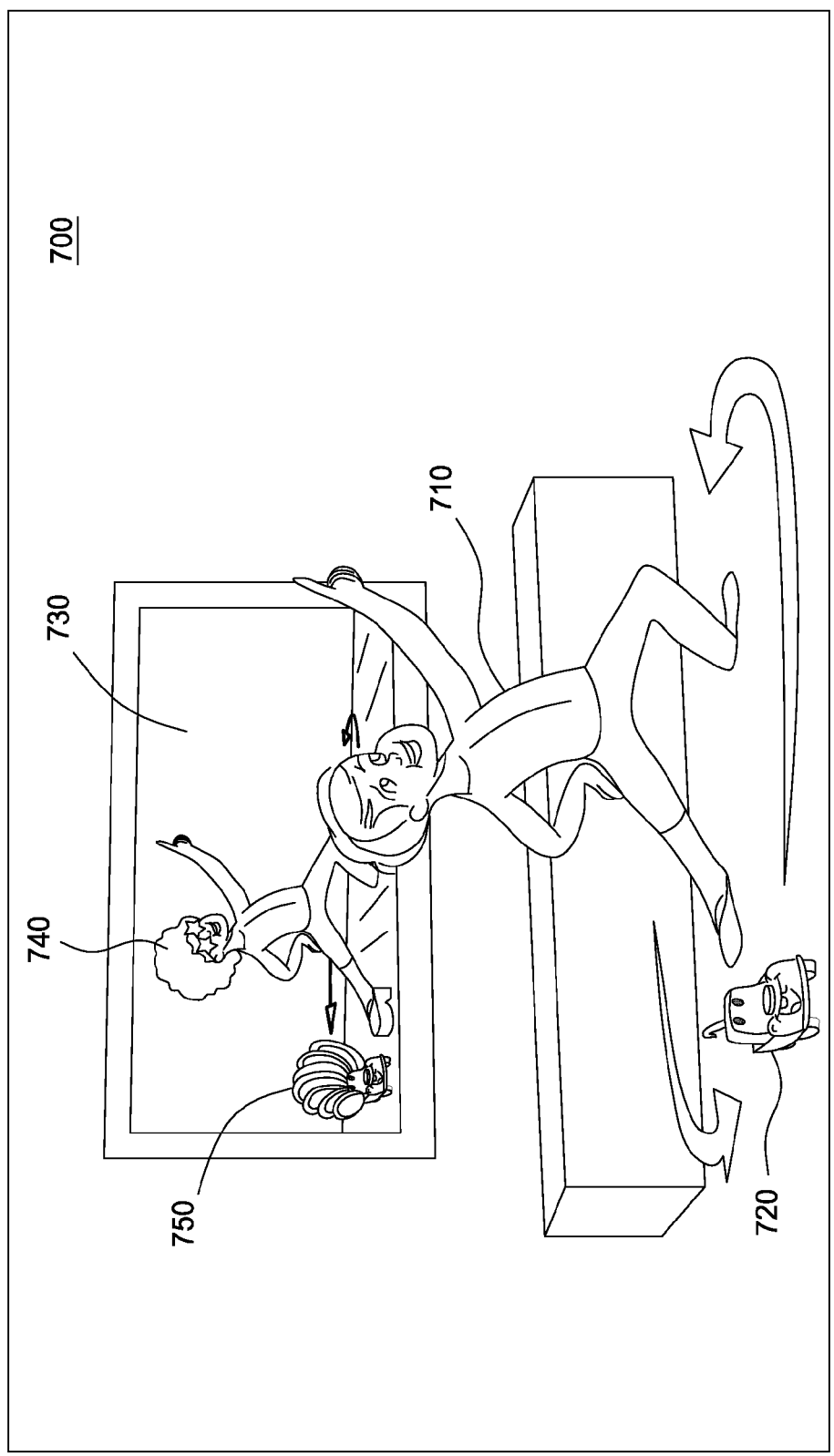
FIG. 7 is a screenshot illustrating the toy car interactive device interacting with a user, according to one embodiment described herein.

In addition to depicting interactions between physical and virtual objects, such augmented reality techniques can be used to alter the appearance of a physical object or a user. An example of this is shown in FIG. 7, which is a screenshot illustrating the toy car interactive device interacting with a user, according to one embodiment described herein. As shown, the screenshot 700 illustrates a user 710, a Mater toy car interactive device 720, and a display device 730. The display device 730 is shown as displaying a rendered frame that includes an augmented depiction 740 of the user 710, as well as an augmented depiction 750 of the toy car device 720. For example, an image(s) of the user 710 and the interactive toy car device 720 could be captured using a camera(s) within the physical environment, and an augmented reality component could render one or more frames depicting an altered form of the image(s) (e.g., the frame shown on the display device 730 in the screenshot 700).

Additionally, as discussed above, embodiments may tailor the immersive play experience specifically for each user. For instance, the experience could be tailored based on the type of interactive toy the user is interacting with (e.g., the Mater car versus the Faerie toy), an interaction between the user and the toy (e.g., Mater suggesting Billy do a disco dance), the user's preferences (e.g., the user's favorite type of music or dance), and so on. For instance, while the Mater car 720 could ask Billy 710 to do a disco dance, based on historical data indicating that Billy 710 is familiar with and/or interested in disco dancing, a faerie toy could ask Susie (i.e., a different user) to do a different type of dance, based on historical data pertaining to Susie. For instance, assume that several weeks ago the faerie toy asked Susie what she wants to be when she grows up and Susie replies "A ballerina!" Subsequently, when asking Susie to dance in front of the augmented reality device (i.e., an action performed responsive to an occurrence of a stimulus event), the faerie toy interactive device could suggest that Susie do a ballet dance, based on the previously obtained user preference information.

Figure 8:
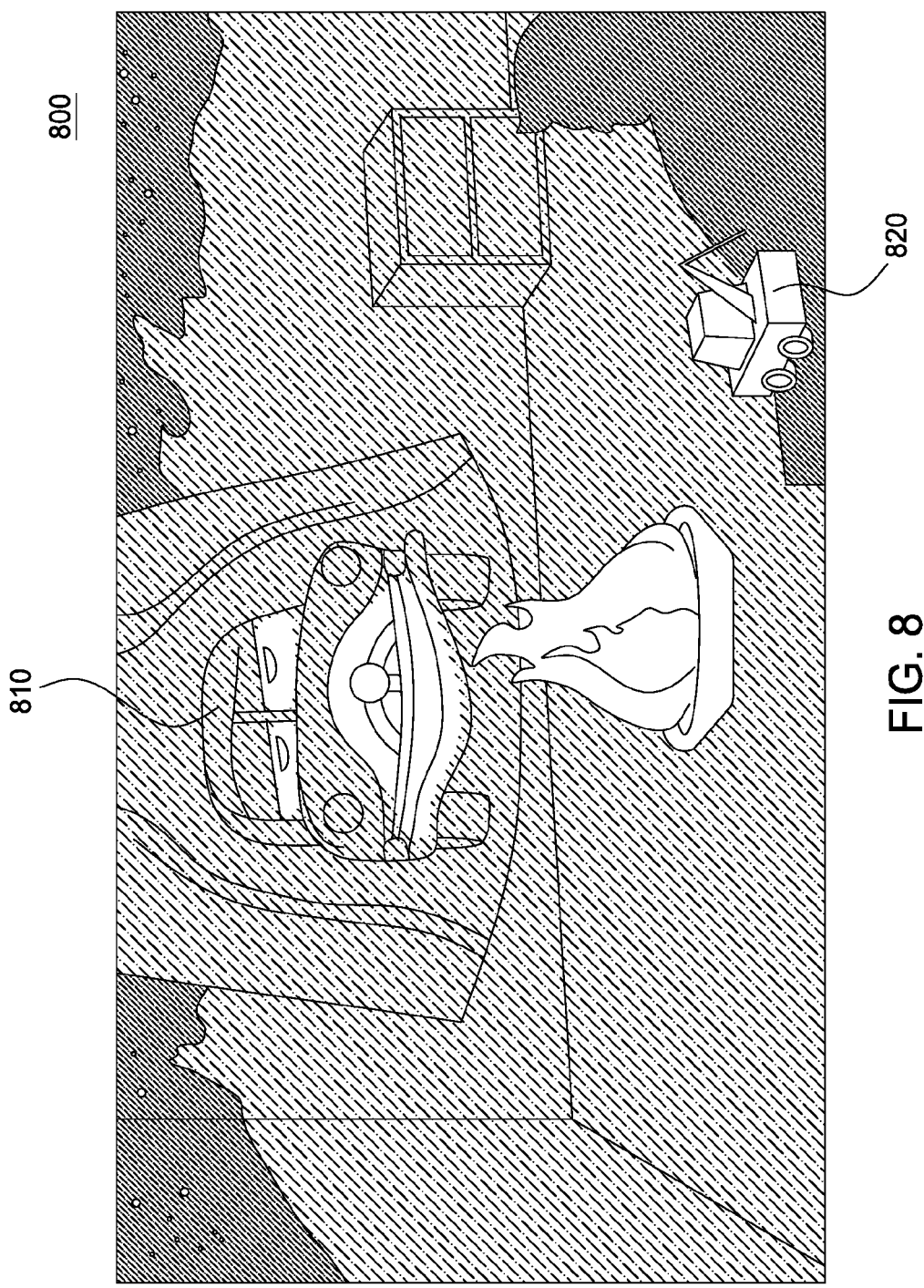
FIG. 8 is a screenshot illustrating a projection from an interactive device, according to one embodiment described herein.

Additionally, the interactive devices may be configured to react responsive to a temporal stimulus event. For example, a particular interactive device could be configured to perform a certain action responsive to detecting it is currently a particular time of day. For instance, embodiments could determine that the current time is 9:59 pm and that Billy typically goes to bed around 10:00 pm, based on historical data describing Billy's past behavior. As such, responsive to detecting it is nearly 10:00 pm, an interactive device could ask the user if he wants to hear a bedtime story. Upon determining that Billy has indicated he would love to hear a bedtime story, the interactive device could access a 360 degree projector object within the room to project a campfire and a night scene on the walls of Billy's room. An example of such a scene is depicted in FIG. 8. Here, the screenshot 800 depicts a projector unit 820 projecting a frame that shows the Mater character 810 sitting in front of a campfire. The projected Mater character could then proceed to tell Billy one of his famous tall tales. In one embodiment, the Mater projection could tailor the story based on historical data characterizing the Mater interactive device's previous activities with the user. For instance, upon determining that Billy was racing with the Mater toy in Radiator Springs earlier that day, the Mater projection (e.g., as controlled by the control device) could tell a tall tale about how he jumped the mile wide canyon in Radiator Springs when he used to be a daredevil.

Figure 9:
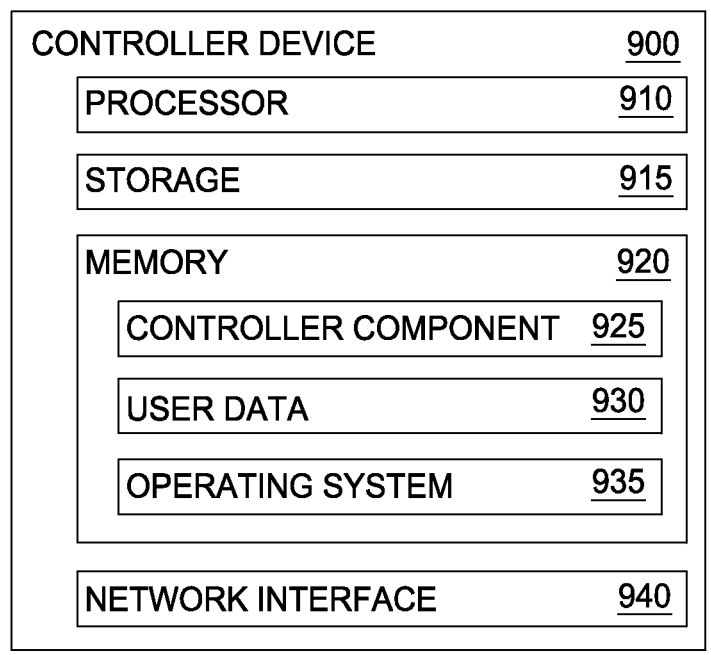
FIG. 9 is a block diagram illustrating a controller device, according to one embodiment described herein.

FIG. 9 illustrates an example of a controller device, according to one embodiment described herein. As shown, the controller 900 includes a processor 910, storage 915, memory 920, and a network interface 940. Generally, the processor 910 retrieves and executes programming instructions stored in the memory 920. Processor 910 is included to be representative of a single CPU, multiple CPUs, a single CPU having multiple processing cores, GPUs having multiple execution paths, and the like. The memory 920 is generally included to be representative of a random access memory. The network interface 940 enables the controller device 900 to connect to a data communications network (e.g., wired Ethernet connection or an 802.11 wireless network). Further, while the depicted embodiment illustrates the components of a particular controller device 900, one of ordinary skill in the art will recognize that interactive objects may use a variety of different hardware architectures. Moreover, it is explicitly contemplated that embodiments may be implemented using any device or computer system capable of performing the functions described herein.

The memory 920 represents any memory sufficiently large to hold the necessary programs and data structures. Memory 920 could be one or a combination of memory devices, including Random Access Memory, nonvolatile or backup memory (e.g., programmable or Flash memories, read-only memories, etc.). In addition, memory 920 and storage 915 may be considered to include memory physically located elsewhere; for example, on another computer communicatively coupled to the controller device 900. Illustratively, the memory 920 includes a controller component 925, user data 930 and an operating system 935. The operating system 935 generally controls the execution of application programs on the controller device 900. Examples of operating system 935 include UNIX, a version of the Microsoft Windows® operating system, and distributions of the Linux® operating system. Additional examples of operating system 935 include custom operating systems for gaming consoles, including the custom operating systems for systems such as the Nintendo DS® and Sony PSP®.

Generally, the controller component 925 configures the interactive objects (e.g., or, in the context of a storytelling experience, the storytelling devices 110) to perform particular actions responsive to detected stimuli. The particular actions can also be based on the user data 930 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 925 transmits logic for recognizing particular events and performing a corresponding action(s) to each of the devices. In such an embodiment, the devices could then use input/output devices (e.g., cameras, microphones, wireless transceivers, infrared sensors, etc.) on the devices to detect when a particular event occurs. For instance, a device could use a camera to detect when a particular projection appears, and could then perform a corresponding action in response, based on the object's current context. As another example, the device could receive a wireless signal (e.g., using Bluetooth communications) from another one of the devices, indicating that a particular action has been performed. The device could then perform the corresponding action responsive to receiving the signal. One advantage to such an embodiment is that the devices may react to a given stimulus relatively quickly, since the reaction logic already resides on the device.

In a particular embodiment, the controller component 925 is configured to directly control the actions of the devices. For instance, the controller component 925 could transmit a message to a first one of the devices, instructing the device to perform a particular action to begin a story or a particular dialogue exchange. The device could then perform the specified action. In one embodiment, the device could transmit an acknowledgement message back to the controller component 925 once the action is successfully performed. In a particular embodiment, the controller component 925 could automatically assume that the device has performed the action after some predetermined period of time since the controller component 925 transmitted the message has elapsed.

In any event, once the controller component 925 determines (or presumes) that the action has been performed, the controller component 925 could identify one or more other devices that, according to a particular story, can react responsive to the performed action. As discussed above, in some circumstances, the controller component 925 could determine a subset of devices that are capable of reacting to the performed action, that should react in response to the performed action. For instance, the controller component 925 could determine that six different devices are capable of reacting both physically and audibly to the performed action. The controller component 925 could then select a subset of the six devices that should react to the particular stimulus event (i.e., the performed action). The controller component 925 could also determine how each of the devices should react. As an example, the controller component 925 could determine that all six devices should react physically to the stimulus event, but that only two of the six devices should react audibly to the stimulus event. Advantageously, doing so helps to prevent the devices from "talking over each other" and helps ensure that the user can clearly hear and understand the audible reactions of the device.

Generally speaking, the devices and the controller 900 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Figure 10:
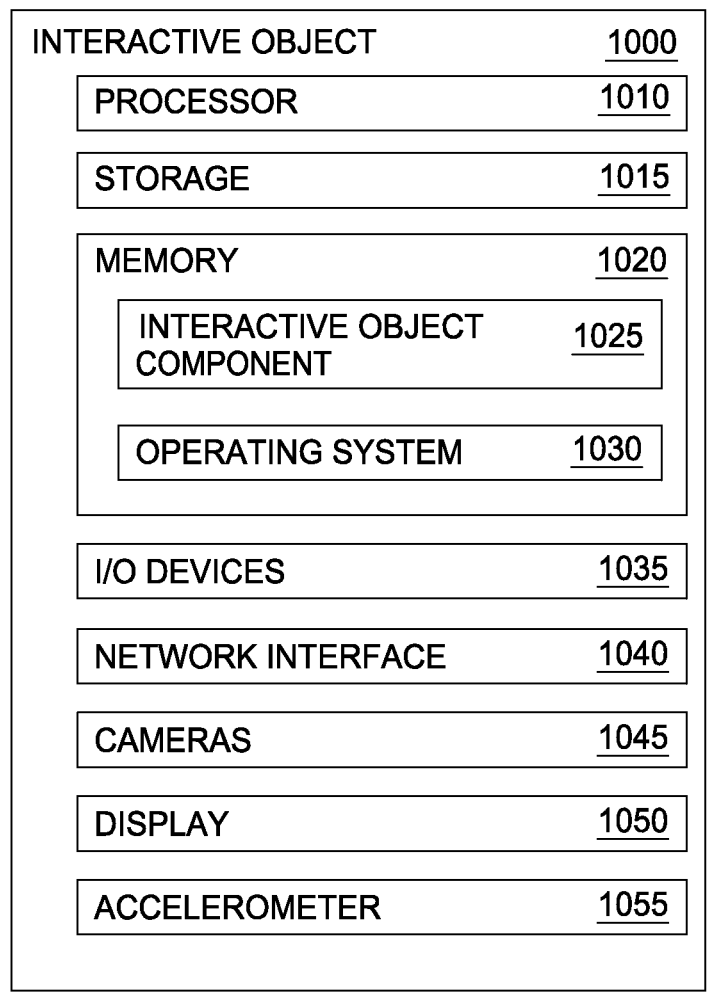
FIG. 10 is a block diagram illustrating an interactive object, according to one embodiment described herein.

An example of an interactive object is shown in FIG. 10, which is a block diagram illustrating an interactive object configured with an interactive object component, according to one embodiment described herein. In this example, the interactive object 1000 includes, without limitation, a processor 1010, storage 1015, memory 1020, I/O devices 1035, a network interface 1040, camera devices 1045, a display device 1050 and an accelerometer device 1055. Generally, the processor 1010 retrieves and executes programming instructions stored in the memory 1020. Processor 1010 is included to be representative of a single CPU, multiple CPUs, a single CPU having multiple processing cores, GPUs having multiple execution paths, and the like. The memory 1020 is generally included to be representative of a random access memory. The network interface 1040 enables the interactive object 1000 to connect to a data communications network (e.g., wired Ethernet connection or an 802.11 wireless network). Further, while the depicted embodiment illustrates the components of a particular interactive object, one of ordinary skill in the art will recognize that interactive objects may use a variety of different hardware architectures. Moreover, it is explicitly contemplated that embodiments may be implemented using any device or computer system capable of performing the functions described herein.

The memory 1020 represents any memory sufficiently large to hold the necessary programs and data structures. Memory 1020 could be one or a combination of memory devices, including Random Access Memory, nonvolatile or backup memory (e.g., programmable or Flash memories, read-only memories, etc.). In addition, memory 1020 and storage 1015 may be considered to include memory physically located elsewhere; for example, on another computer communicatively coupled to the interactive object 1000. Illustratively, the memory 1020 includes an interactive object component 1025 and an operating system 1030. The operating system 1030 generally controls the execution of application programs on the interactive object 1000. Examples of operating system 1030 include UNIX, a version of the Microsoft Windows® operating system, and distributions of the Linux® operating system. Additional examples of operating system 1030 include custom operating systems for gaming consoles, including the custom operating systems for systems such as the Nintendo DS® and Sony PSP®.

The I/O devices 1035 represent a wide variety of input and output devices, including displays, keyboards, touch screens, and so on. For instance, the I/O devices 1035 may include a display device used to provide a user interface. As an example, the display may provide a touch sensitive surface allowing the user to select different applications and options within an application (e.g., to select an instance of digital media content to view). Additionally, the I/O devices 1035 may include a set of buttons, switches or other physical device mechanisms for controlling the device 1000. Additionally, the I/O devices 1035 could include mechanized components or other components that enable the interactive object 1000 to take a physical action (e.g., vibrating, walking around the room, gesturing, facial expressions, etc.).

The interactive object component 1025 may be configured to recognize various stimulus events and to associate a respective one or more actions with each of the various stimulus events. Upon detecting that one of the stimulus events has occurred, the interactive object 1025 could perform the corresponding one or more actions. For instance, the interactive object 1000 could be a toy Mater car could be configured with an interactive object 1025 that, upon detecting that it's time for a user to brush his teeth, could remind the user to brush his teeth (e.g., using one or more speaker I/O devices 1035 and a text-to-speech synthesizer). Additionally, the interactive object component 1025 could determine which actions to perform based on a variety of factors, including historical interactions with the user, historical interactions between the user and other interactive objects, user preferences data, other interactive objects in the immediate area, and so on. Thus, the interactive object component 1025 could be configured to react differently to a given stimulus event, depending on the variety of factors.

As discussed above, the interactive object component 1025 may detect the occurrence of the stimulus event in a variety of different ways. For instance, the interactive object component 1025 could use the camera devices 1045 to detect when a projected image appears or to track the movement of the user. As another example, the interactive object component 1025 could use the accelerometer 1055 to detect when the user rubs the interactive object 1000 with his hand (e.g., where the device is a magic mirror) or when the user has set the device down on the floor. Additionally, the interactive object component 1025 could use other I/O devices 1035 to make such a determination, such as a touch-sensitive device capable of detecting when and how the user is touching the device (e.g., a capacitive sensing or conductance sensing tactile surface). Furthermore, the controller 2120 could transmit a message to the device 1000 (e.g., using Wi-Fi or Bluetooth communications), indicating that a particular stimulus event has occurred. More generally, any technique capable of detecting the occurrence of some predefined event may be used, in accordance with the functionality described herein.

Additionally, the interactive object 1000 may be configured with logic and/or hardware to determine its geographic, physical position within the physical world. Examples of such logic and/or hardware include GPS logic and a global positioning system (GPS) transmitter, and geolocation software that uses time of flight or angle of flight or both (from a multiplicity of wireless sources such as cell towers, television broadcast towers, or wireless IP devices). More generally, any technique (known or unknown) for determining a device's physical position in the real world may be used, consistent with the functionality described herein.

Magic Mirror Interactive Device

Additionally, embodiments provide a magic mirror apparatus configured to serve as an endpoint device in a video conferencing session. As used herein, videoconferencing refers to any real-time or substantially real-time video streaming session, where audio and video (AV) data is captured at one or more endpoint devices and is transmitted to one or more remote endpoint devices for output. The mirror device may include an enclosure having a one-way mirrored portion. The one-way mirrored portion could include an exterior side having a mirrored surface and an interior side that is transparent. Generally, the exterior surface is mirrored to the degree that it impairs a user's ability to see the components on the interior of the magic mirror apparatus, as reflections in the mirrored surface are brighter than the darker interior of the mirror device. Moreover, the transparent surface on the interior can allow light (e.g., from a display device) to more easily pass through from the inside of the apparatus to the exterior.

The apparatus may further include a display device disposed within the enclosure, where the display device has a viewable portion (e.g., a display screen) configured to exhibit an image that is visible through the one-way mirror portion. For instance, the display device could include a liquid-crystal display (LCD) or a light-emitting diode (LED) display. In this way, the viewable portion of the display device may be seen through the one-way mirrored portion when actively displaying an image, but otherwise may remain hidden from view. That is, because the interior of the enclosure may be darker than the mirror's physical environment, the reflection on the surface of the exterior mirrored surface may be brighter than the components on the inside of the enclosure, thus making the interior components more difficult to see.

The apparatus may also include a speaker device disposed within the enclosure. Such a speaker device may be used to output an audio stream of a videoconferencing stream. For example, an audio stream could be captured using a microphone device within a remote endpoint device (e.g., a remote magic mirror device) and could be transmitted to the magic mirror device (e.g., via a network). The audio stream could then be output using the speaker device within the magic mirror enclosure. Similarly, the magic mirror device may include a microphone device configured to capture audio and to convert the captured audio into audio data. Here, the microphone could be used to capture an audio stream, which could in turn be transmitted to a remote endpoint device for output as part of a video conferencing session.

Additionally, the apparatus could include a camera sensor configured to capture an image and to convert the captured image into an electronic signal. Here, the camera sensor could represent a video camera device that is configured to capture a video stream (e.g., to transmit to a remote endpoint device as part of a videoconferencing session). In one embodiment, the camera sensor is positioned within the enclosure at a location approximately at the user's eye-level, so that the video stream captures the user looking directly into the camera. Doing so can improve the magic mirror effect when the captured video stream is displayed on the remote endpoint device, as the user's depiction within the captured video stream will appear to look directly at the remote user when the video stream is displayed.

The apparatus could further include a network adapter configured to receive and transmit network data, e.g., to facilitate a videoconferencing session between the magic mirror device and a remote endpoint device. Generally, the network adapter can be any network adapter capable of transmitting and receiving data over a network. Examples of such a network adapter may include wired and wireless adapters (e.g., an adapter configured to communicate according to an IEEE 802.11 protocol, an adapter configured to send and receive 3G and/or 4G mobile communications, etc.). Moreover, the apparatus could include encoder logic and decoder logic, for use in encoding outgoing audio and video (AV) data and decoding incoming AV data during a videoconferencing session with a remote endpoint device. It is broadly contemplated that any known (or unknown) encoding and decoding technique for AV data may be used, consistent with the present disclosure. Preferably, the AV data may be encoded in a format having a highest quality while not exceeding the capabilities of the network adapter and the network to which the network adapter connects.

Generally, the mirror apparatus can be implemented in a variety of different forms. For example, one embodiment provides a stationary embodiment configured to affix to a surface (e.g., a wall of a home) or to a base (e.g., a mirror stand which holds the apparatus upright on a surface, such as a table). As another example, another embodiment provides a hand-held mirror apparatus, having a handle portion through which a user may hold the mirror apparatus. Generally, it may be preferable for such a hand-held implementation to communicate through some form of wireless communications. More generally, however, the mirror apparatus can be implemented in any form, consistent with the functionality described herein.

In one embodiment, the mirror apparatus is configured to provide an interface through which a user can provide input (e.g., commands) to the mirror apparatus. For example, a user could specify that a videoconferencing session should be established with a remote endpoint device or that a current videoconferencing session should be terminated. In one embodiment, a remote application (e.g., running on a mobile device) is configured to provide an interface through which a user can control the mirror apparatus. In another embodiment, the mirror apparatus is configured to display an interface using the display device within the enclosure. In such an embodiment, the mirror apparatus could be configured with a touchscreen display device through which a user can provide input. For example, an interface could be displayed with the option "Initiate Videoconferencing Session" and, upon selecting this option by touching the corresponding portion of the touchscreen device, the interface could display a list of known endpoint devices and any corresponding descriptions for these endpoints (e.g., "Grandma", "Aunt Sue", etc.). Upon the user selecting one of these endpoint devices using the touchscreen, logic within the magic mirror apparatus could initiate a videoconferencing session with the selected endpoint device.

In a particular embodiment, the magic mirror device could be configured to respond to auditory commands from the user. For example, a user could speak one or more commands and the magic mirror device could capture this sound using a microphone device. Logic within the mirror could then process the captured sound and could determine whether the captured sound matches any recognized commands. If so, the logic could then perform a predefined response according to the recognized command. For example, the user could say "Call Grandma" and the logic could process this audio and could determine that "Call" corresponds to a command to initiate a new videoconferencing session and that "Grandma" corresponds to a predefined alias defined for an endpoint device. In response, the logic could initiate a videoconferencing session with the specified endpoint device. Advantageously, doing so provides an interface through which users can audibly interact with the magic mirror device.

Figure 11:
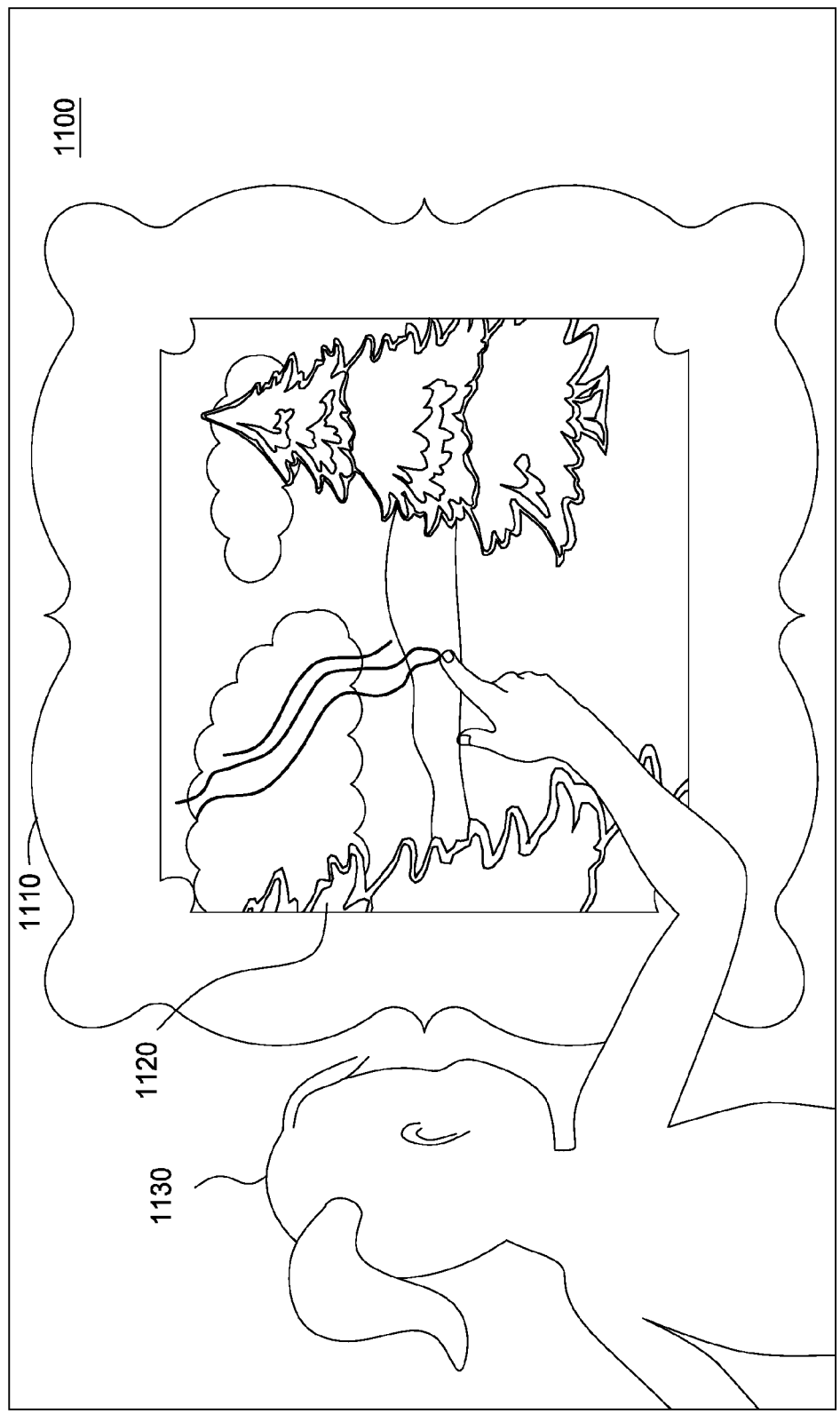
FIG. 11 illustrates a user interacting with a magic mirror device, according to one embodiment described herein.

FIG. 11 illustrates a user interacting with a magic mirror device, according to one embodiment described herein. Generally, FIG. 11 depicts one example of a magic mirror device used as a storytelling device in a storytelling experience. In the depicted embodiment, the magic mirror device 1110 includes a mirrored surface 1120. For purposes of this example, assume that the magic mirror object 1110 includes a touch screen display device positioned behind the mirrored surface 1120. As shown, the illustration depicts a user 1130 interacting with the magic mirror 1110. In this example, the display device within the magic mirror 1110 is depicting a wintery scene. As part of the storytelling experience, the magic mirror 1110 could begin displaying such a scene, for instance, responsive to another storytelling device making a comment about washing away winter and bringing on spring.

For example, the user 1130 could carry the other storytelling device to within a predefined distance from the magic mirror device 1110, and in response, the other storytelling device could say "Use your hand and wipe all this nasty winter weather away!" The magic mirror 1110, upon detecting Susie's hand moving across the touchscreen display device (e.g., as shown in the illustration 1100), could render a springtime scene in a portion of the screen that the user's hand touched. Once the user 1130 finishes moving her hand all the way across the magic mirror 1110, the display of the magic mirror 1110 could fully depict a springtime scene. Additionally, once the entire winter scene has been washed away by the child's hand, the other storytelling device could proclaim "You've done it! Spring is here!" Of course, the depicted example is provided without limitation and for illustrative purposes, and more generally the magic mirror device 1110 could contribute to a storytelling experience in any number of different ways.

Figure 12:
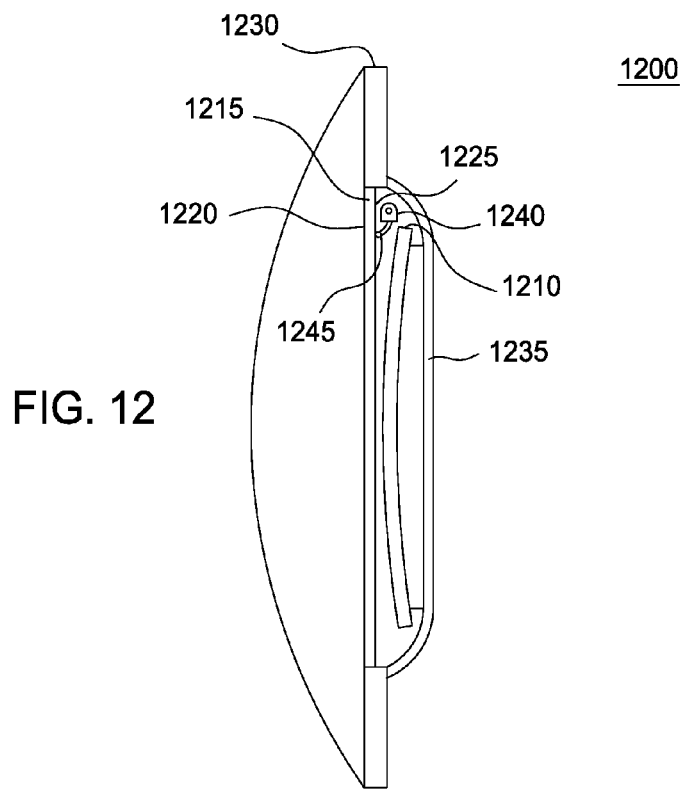
FIG. 12 illustrates a side view of a magic mirror device, according to one embodiment described herein.

FIG. 12 illustrates a side view of a magic mirror device, according to one embodiment described herein. As shown, the device 1200 includes an enclosure formed by a frame 1230, a front surface 1215 and a rear portion 1235. The front surface 1215 generally represents a one-way mirror, having a mirrored surface 1225 on the exterior of the enclosure and a transparent surface 1225 on the interior of the enclosure. The front surface 1215 may be constructed from any material suitable for use with a one-way mirror, and examples of such materials include, without limitation, glass and plastic materials.

Generally, the frame 1230 serves an aesthetic purpose, and can be adapted based on the desired look of a particular mirror device. The rear portion 1235 of the enclosure generally serves to protect the components on the inside of the mirror device 1200. The rear portion 1235 can be made using an opaque material, so as to hide the components within the enclosure and to prevent ambient light from entering the enclosure. Doing so helps to enhance the effect of the magic mirror device 1200, as users cannot easily see the hardware components within the mirror through the rear portion 1235. Furthermore, preventing light from entering the interior of the enclosure helps to further the illusion of an image (e.g., a person's face) appearing within the mirrored surface of the mirror device, as the reflections in the mirrored surface 1220 are brighter than the dimly lit interior of the enclosure, thereby hiding the hardware components within the enclosure from view through the mirrored surface 1220.

The mirror device 1200 also includes a display device 1210, a camera device 1240 and a microphone device 1245. As discussed above, in one embodiment the mirror device 1200 is configured to serve as an endpoint in a videoconferencing session. In such an embodiment, the camera device 1240 could capture a video stream of a user(s) looking into the mirrored surface 1220 and could further capture an audio stream using the microphone device 1245. The mirror 1200 could then transmit (e.g., using a network adapter) the captured AV data to a remote endpoint device of the videoconferencing session for output. In such an embodiment, the mirror device 1200 may also include encoder logic for converting the captured AV data into a format suitable for network transmission. As shown, the camera device 1240 is positioned towards the top of the mirror device, such that it is likely the camera device 1240 will be at eye level of a user looking into the mirrored surface 1220. Doing so allows the camera device 1240 to capture a video stream where the user is looking directly into the camera, which can enhance the visual effect of the remote endpoint device being a "magic mirror" when the video stream is displayed on the remote endpoint device.

Additionally, the mirror device 1200 could include decoder logic for decoding received AV data (e.g., from a remote endpoint device in a videoconferencing session). For instance, the mirror device 1200 could receive (e.g., using a network adapter) encoded AV data from a remote magic mirror device, and the decoder logic could decode the encoded AV data for output on the display device 1210 and one or more speakers (e.g., within the magic mirror device 1200, within the physical environment and communicatively coupled to the mirror device 1200, etc.). For example, the encoded AV data could include a video stream of a user looking directly into a camera at a remote magic mirror device (i.e., by nature of the camera being positioned within the remote mirror device at approximately eye-level). When such AV data is decoded and displayed using the display device 1210, the effect is that the remote user's head and face appears within the mirrored surface 1220, creating a "magical mirror" effect.

In one embodiment, the camera device 1240 is configured to detect a user's head within the captured video stream, and to adjust its magnification to a predefined level (e.g., by zooming in or out). Doing so can help to normalize the user's appearance on the remote endpoint device(s), regardless of the distance between the user and the camera device 1240. In a particular embodiment, the magic mirror 1200 is configured to fade in the display the decoded AV data, so that the remote user's face appears to materialize within the mirrored surface 1220. More generally, any visual (or auditory) effect can be applied to the decoded AV data (and/or to the encoded AV data). Examples of other such effects could include, without limitation, visual effects having traditional storytelling meaning, such as swirling or wavy imagery which historically has indicated to viewers that the characters being viewed are transitioning to a different context, e.g., a flashback or dream sequence. Additional examples include wipes, swirls, pixelizations, morphs, and more general any visual or auditory effect can be used, consistent with the functionality described herein.

Figure 13:
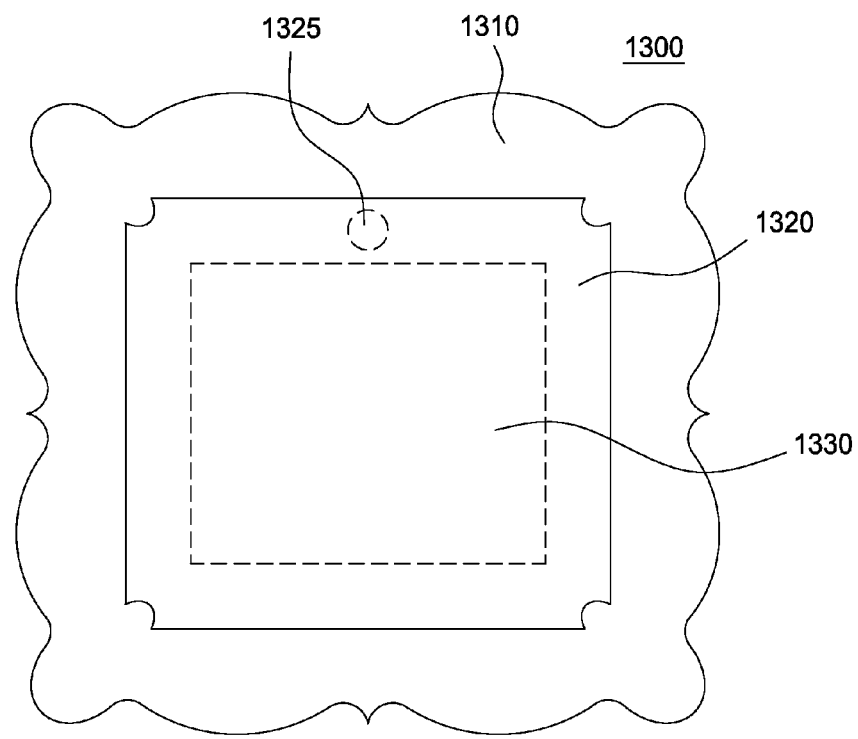
FIG. 13 illustrates a front view of a magic mirror device, according to one embodiment described herein.

FIG. 13 illustrates a front view of a magic mirror device, according to one embodiment described herein. As shown, the mirror 1300 includes a frame 1310 and a mirrored surface 1320. As discussed above, the mirrored surface 1320 may be a one-way mirrored surface that is mirrored only on the exterior side, while the interior side of the mirrored surface 1320 is transparent. Advantageously, doing so allows light from the interior of the mirror enclosure (e.g., light emitted from a display device within the enclosure) to more easily permeate the surface 1320.

As shown, the mirror 1300 also includes a dotted outline 1325 showing a position of a camera device within the mirror enclosure, and a dotted outline 1330 showing a position of a display device within the mirror enclosure. As discussed above, the camera device (as shown by the outline 1325) is positioned at approximately eye level, so that the video stream captured by the camera device will show the user looking directly into the camera. Doing so will ensure that the displayed video stream on the remote endpoint device (e.g., a second magic mirror device) will depict the user's head looking directly at the remote user.

Figure 14C:
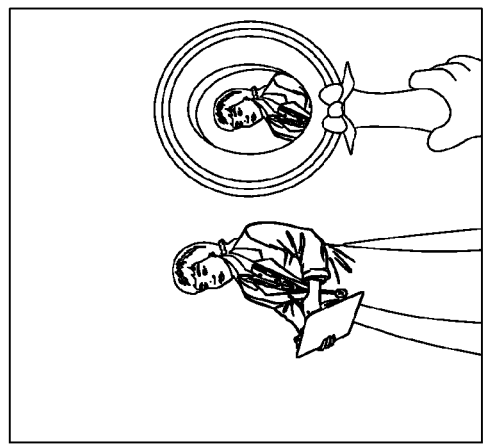
FIGS. 14A-C illustrate magic mirror devices, according to embodiments described herein.
Figure 14B:
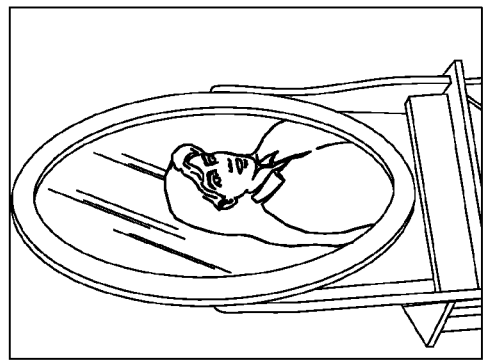
Figure 14A:
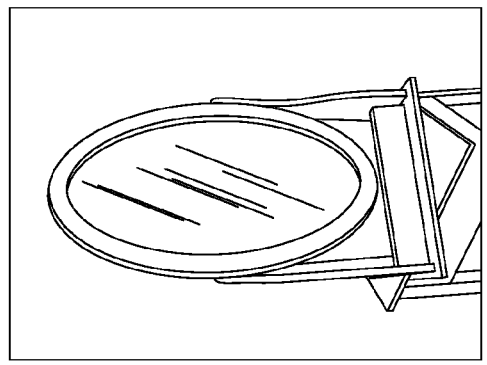

FIGS. 14A-C illustrate magic mirror devices, according to embodiments described herein. As shown, the FIG. 14A depicts a magic mirror device 1400 with the display device disabled or otherwise not emitting a substantial amount of light (e.g., when the display device is actively displaying a black screen). Of note, the internal components of the device 1400 cannot be seen, as the reflection in the mirrored surface of the magic mirror is brighter than the interior of the magic mirror enclosure, thus masking the interior hardware components from view.

However, when the display device begins to display decoded AV data (e.g., received from a remote endpoint device in a videoconferencing session), the remote user's face will appear within the mirror surface of the mirror, creating a "magical mirror" effect. An example of this is shown in FIG. 14B, which illustrates a magic mirror device 1410 actively displaying encoded AV data. Here, the remote user's face can be seen within the mirrored surface of the device 1410, creating the aforementioned "magical mirror" effect. Of note, the depicted embodiment also includes light emitting devices within the frame of the mirror, which are enabled when the mirror begins displaying the received AV data.

As discussed above, the magical mirror device can reside in a number of different forms. For instance, although FIGS. 14A-B depict a mirror device that rests on a base (e.g., a stand which is placed atop a table), other mirror devices may include a wall-mounted implementation and a hand-held implementation. One example of such a hand-held implementation is shown in FIG. 14C. Here, the hand-held magic mirror device 1420 is displaying a video feed captured from a remote endpoint device (i.e., a mobile phone held by the remote user in this example). For example, the remote endpoint device and the magic mirror device 1420 could communicate over a network using an IEEE 802.11 communications protocol.

In one embodiment, one or more bridge devices and/or applications reside within the network and serve as an intermediary between the endpoint devices in the videoconferencing session. Such bridge devices and/or applications could be used, for example, to combine AV streams from multiple endpoint devices into a single stream for output on one of the endpoint devices. Thus, a magic mirror device could display two video feeds simultaneously, e.g., resulting in the faces of two remote users appearing within the surface of the mirror. Similar to as discussed above, the mirrored exterior surface of the device 1420 masks the view of the interior hardware components, due to the reflection in the mirrored surface being brighter than the hardware components within the enclosure.

Of note, however, although particular embodiments are described above as endpoint devices in a videoconferencing session, more generally the magic mirror devices can be used for a number of different purposes. For instance, instead of outputting AV data received from a remote endpoint device, the magic mirror device could predefined output AV data, e.g., received from a controller device in a storytelling environment. For example, a video stream depicting a fictional character involved in a particular storyline could be transmitted to the magic mirror device (e.g., from the controller device), along with an accompanying audio stream. Upon receiving the streaming AV data from the controller device, the magic mirror could decode the AV data (e.g., using decoder logic within the magic mirror device) and could output the decoded AV data (e.g., using the internal display device as well as one or more speaker devices). For example, the video stream could be displayed such that the character's face gradually fades into view over a window of time (e.g., a few seconds).

The mirror device could then continue to interact with the user as part of a storytelling experience. For instance, the mirror device could be configured with logic capable of detecting occurrences of stimulus events and performing defined actions in response, based on a current context of a story. For example, the mirror device could output the video and audio streams depicting the fictional character speaking with the user, and the fictional character could pose a question to the user regarding which storyline arc the user would like to follow today. As an example, the fictional character could ask the user whether he wishes to search for a hidden key, or whether the user wishes to journey to retrieve a magical sword. The user could then audibly respond to the question, and logic within the mirror device could detect the response (e.g., using one or more microphone devices) and could analyze the response to determine which of the storyline arcs the user selected. Upon determining the detected response corresponds to one of the storyline arcs, the story could proceed down the selected arc, and a controller device could configure the storytelling devices involved in the story accordingly (including the mirror device). Advantageously, doing so creates the illusion of a "magical mirror" in contexts other than videoconferencing.

Figure 15:
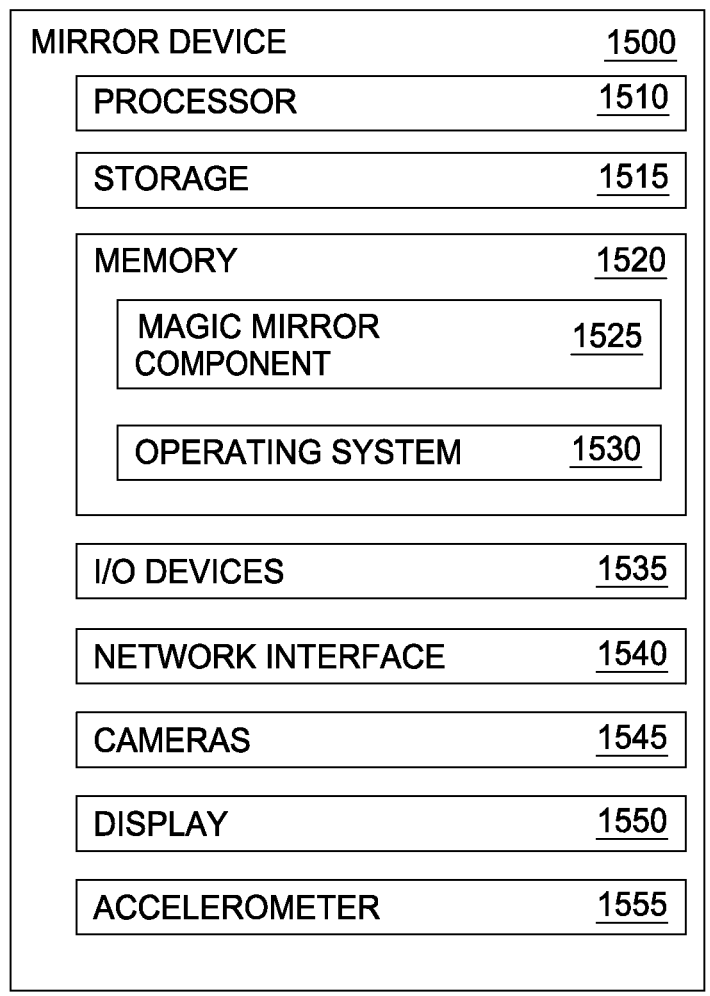
FIG. 15 is a block diagram illustrating a magic mirror device, according to one embodiment described herein.

FIG. 15 is a block diagram illustrating a magic mirror device, according to one embodiment described herein. In this example, the mirror device 1500 includes, without limitation, a processor 1510, storage 1515, memory 1520, I/O devices 1535, a network interface 1540, camera devices 1545, a display devices 1550 and an accelerometer device 1555. Generally, the processor 1510 retrieves and executes programming instructions stored in the memory 1520. Processor 1510 is included to be representative of a single CPU, multiple CPUs, a single CPU having multiple processing cores, GPUs having multiple execution paths, and the like. The memory 1520 is generally included to be representative of a random access memory. The network interface 1540 enables the magic mirror device 1500 to connect to a data communications network (e.g., wired Ethernet connection or an 802.11 wireless network). Further, while the depicted embodiment illustrates the components of a particular magic mirror device, one of ordinary skill in the art will recognize that magic mirror devices may use a variety of different hardware architectures. Moreover, it is explicitly contemplated that embodiments may be implemented using any device or computer system capable of performing the functions described herein.

The memory 1520 represents any memory sufficiently large to hold the necessary programs and data structures. Memory 1520 could be one or a combination of memory devices, including Random Access Memory, nonvolatile or backup memory (e.g., programmable or Flash memories, read-only memories, etc.). In addition, memory 1520 and storage 1515 may be considered to include memory physically located elsewhere; for example, on another computer communicatively coupled to the storytelling device 110. Illustratively, the memory 1520 includes a magic mirror component 1525 and an operating system 1530. The operating system 1530 generally controls the execution of application programs on the storytelling device 100. Examples of operating system 1530 include UNIX, a version of the Microsoft Windows® operating system, and distributions of the Linux® operating system. Additional examples of operating system 1530 include custom operating systems for gaming consoles, including the custom operating systems for systems such as the Nintendo DS® and Sony PSP®.

The I/O devices 1535 represent a wide variety of input and output devices, including microphones, speakers, keyboards, infrared transceivers and so on. Generally, the display device 1550 represents any device capable of outputting image data for display. Examples of such display devices 1550 include, without limitation, a light-emitting diode (LED) display and a liquid-crystal display (LCD), as well as touchscreen implementations of these and other display devices. Such a touchscreen device may be used, for example, during a storytelling experience or as an interface for the magic mirror device, as the user could use such a touchscreen to select different applications and options within an application (e.g., to select an endpoint device to initiate a videoconferencing session with). Additionally, the I/O devices 1535 may include a set of buttons, switches or other physical device mechanisms for controlling the magic mirror device 1500. Additionally, the I/O devices 1535 could include mechanized components or other components that enable the magic mirror device 1500 to take a physical action (e.g., vibrating, moving around the room, etc.).

The magic mirror component 1525 may be configured to encode AV data captured using the cameras 1545 and I/O devices 1535 (e.g., a microphone), and to transmit the encoded AV data to a remote endpoint device (e.g., using network interface 1540). Similarly, the magic mirror component 1525 could be configured to decode AV data received (e.g., over the network interface 1540) and to output this data for display (e.g., on display device 1550). As discussed above, the display device 1550 could be positioned within an enclosure of the mirror device 1500, behind a one-way mirrored surface, such that the structure of the display device 1550 (e.g., the frame, the cabling, etc.) cannot be seen through the mirrored surface, but images shown on the screen of the display device 1550 can be seen through the mirrored surface. Advantageously, doing so creates a "magic mirror" effect in which the displayed images (e.g., a video feed from a remote endpoint to a videoconferencing session) appear within the mirrored surface.

Additionally, the magic mirror component 1525 can include logic to function as a storytelling device as part of a storytelling experience. For example, the magic mirror component 1525 could be configured to recognize various stimulus events and to associate a respective one or more actions with each of the various stimulus events. Upon detecting that one of the stimulus events has occurred, the magic mirror component 1525 could perform the corresponding one or more actions. For instance, the magic mirror component 1525 could display AV data depicting a fictional character and, upon detecting that a holographic genie projection has been projected by another storytelling device, could cause the displayed fictional character to cower in fear and to emit whimpering noises in fright of the genie. Additionally, the magic mirror component 1525 could determine which actions to perform based on a current context of a story being told using a multitude of storytelling devices 110. That is, the depicted fictional character could be displayed as behaving differently when the genie first appears within the story (e.g., appearing afraid of the genie), and may be displayed as behaving differently when the genie comes to the user's rescue later in the story (e.g., appearing grateful upon seeing the genie). Thus, the magic mirror component 1525 could be configured to react differently to a given stimulus event, depending on the current context within the story.

Generally, the magic mirror component 1525 may detect the occurrence of the stimulus event in a variety of different ways. For instance, the magic mirror component 1525 could use the camera devices 1545 within the magic mirror device 1500 to detect when a projected image appears or to track the movement of the user. As another example, the magic mirror component 1525 could use the accelerometer 1555 to detect when the user has picked up the magic mirror device 1500 (e.g., when the device 1500 is a hand-held device), based on readings from the accelerometer 1555 matching a particular signature. In response, the magic mirror component 1525 could initiate a dialogue with the user, e.g., asking the user what he wishes to do (e.g., initiate a videoconferencing session with a remote endpoint device, play through a story, etc.). Additionally, the storytelling component 1525 could use other I/O devices 1535 to make such a determination, such as touch-sensitive device capable of detecting when and how the user is touching the device 110 (e.g., a capacitive sensing or conductance sensing tactile surface). Furthermore, the controller 120 could transmit a message to the device 110 (e.g., using Wi-Fi or Bluetooth communications), indicating that a particular stimulus event has occurred. More generally, any technique capable of detecting the occurrence of some predefined event may be used, in accordance with the functionality described herein.

Additionally, the magic mirror device 1500 may be configured with logic and/or hardware to determine its geographic, physical position within the physical world. Examples of such logic and/or hardware include GPS logic and a global positioning system (GPS) transmitter, and geolocation software that uses time of flight or angle of flight or both (from a multiplicity of wireless sources such as cell towers, television broadcast towers, or wireless network devices). More generally, any technique (known or unknown) for determining a device's physical position in the real world may be used, consistent with the functionality described herein.

Additionally, embodiments may synchronize with existing media devices such as TVs, web devices, smart phones and e-books, in providing an immersive storytelling experience. For example, the magic mirror device 1500 could sense events on a TV show the user is currently watching or a video game the user is currently playing (e.g., through communications with the TV and/or video game system, using one or more cameras, using a microphone, etc.). In response to detecting such a stimulus event, the mirror device 1500 could react in a context-appropriate manner and precisely at exactly the right time. For instance, upon detecting that an ESPN® newscaster on a TV the user is currently watching made a reference to an upcoming football game between the Giants® and the Panthers®, and upon determining that the Giants® won their previous game, the magic mirror device 1500 could output a display of a fictional character's head, saying "Boy, I sure hope the Giants® can pull it off again this weekend!" (e.g., using a text-to-speech synthesizer and one or more speaker devices).

As another example, the magic mirror device 1500 could communicate with an eBook reader controlled by the user to determine which book the user is currently reading and which page of a particular book the eBook reader is currently displaying. The magic mirror device 1500 could then chime in at exactly the right time (e.g., momentarily after the user has turned the page) by displaying a head of a fictional character and outputting an audio stream with commentary to enhance the story being told on the legacy media platform (i.e., the book the user is reading).

Virtual and Physical World Interactions

In addition to interacting with other nearby storytelling devices, some devices can interact with remote devices as well. An example of this is discussed in FIGS. 16 and 17.

Figure 16:
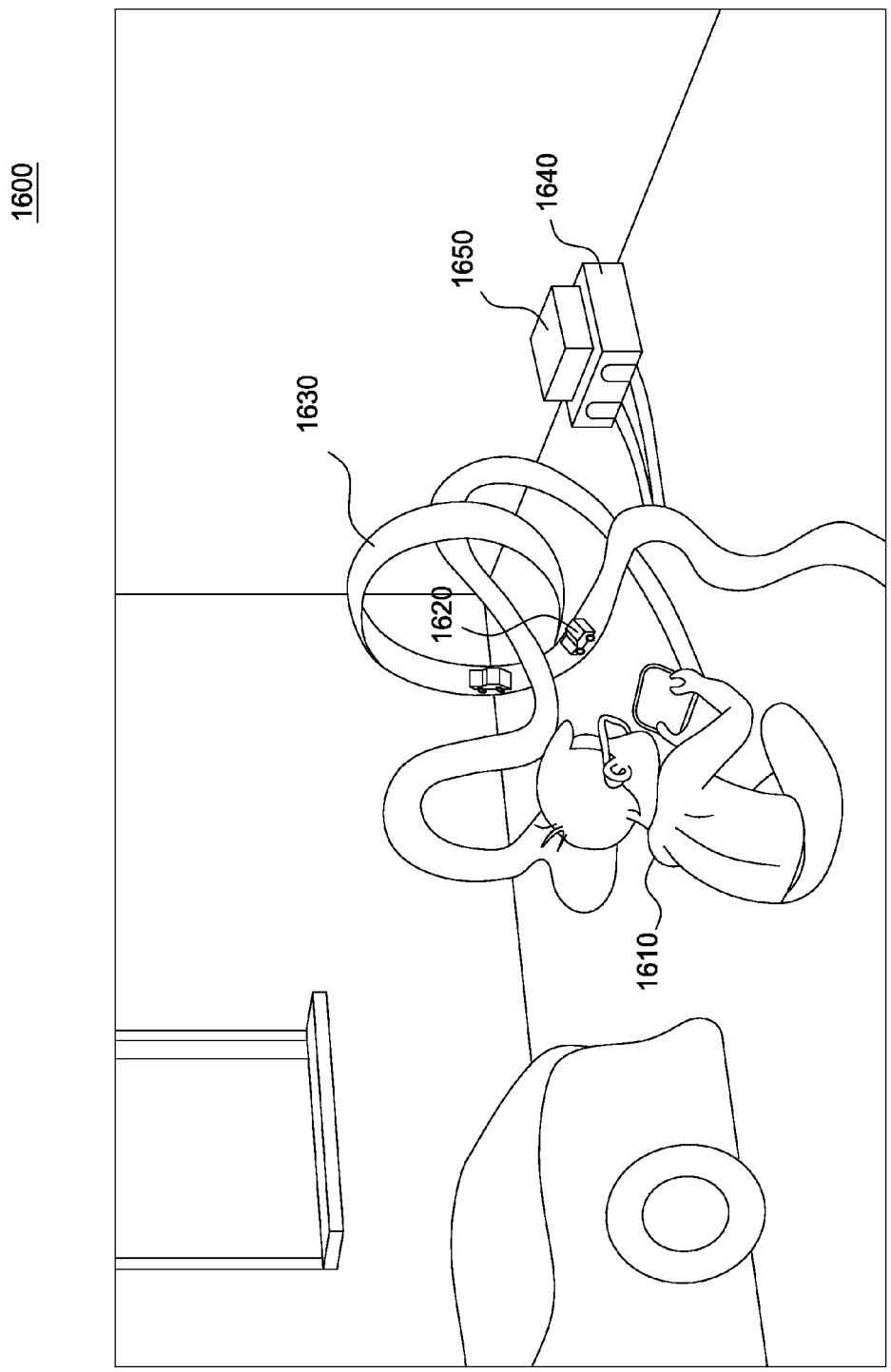
FIG. 16 illustrates a physical racetrack system, according to one embodiment described herein.

FIG. 16 is a screenshot of an interactive object interacting with a child, according to one embodiment described herein. As shown, the screenshot 1600 includes a user 1610, playing with an interactive Mater toy car 1620 and a race track 1630. Additionally, the race track 1630 is coupled to a tunnel interactive object 1640, which in turn is configured with a combined camera/projection unit 1650. Here, the interactive objects (e.g., the Mater toy car 1620 and the tunnel 1640) could be in communication with remote interactive objects used by a second child who is remote from the user 1610 (and/or with a controller object associated with the remote interactive objects).

For instance, upon determining that the user 1610 is playing with his Mater toy car 1620 and that the user's friend Jill is also playing with her interactive toy car in a location remote from the user's 1610 location (e.g., Jill's house), and further knowing that the user's friend also has a tunnel interactive object with a combined camera/projection unit, the Mater car 1620 could say "Hey Billy, your friend Jill is available for a race! You game?" If the user 1610 responds in the affirmative, the camera/projection unit 1650 could render a scene depicting Jill (i.e., the remote user in this example) and her interactive object(s) on the wall above the unit. That is, a two-way video conferencing session could be established between the camera/projection unit 1650 and the second camera/projection unit associated with the user's 1610 friend Jill, in which the user 1610 is able to see Jill and her immediate physical environment, and in which Jill is able to see the user 1610 and his interactive objects (e.g., the car 1620, the track 1630, etc.). In doing so, the camera/projection unit 1650 could capture images of the user 1610 and his environment (e.g., using one or more cameras) and could transmit these images to the projection component of the camera/projection unit associated with the remote user (e.g., using a communications network). The remote projection unit could then render these captured images, allowing Jill to see the user 1610 and his environment. More generally, the camera and projector need not be in a combined unit, and could exist as separate units coordinated through software and communications technology.

Figure 17:
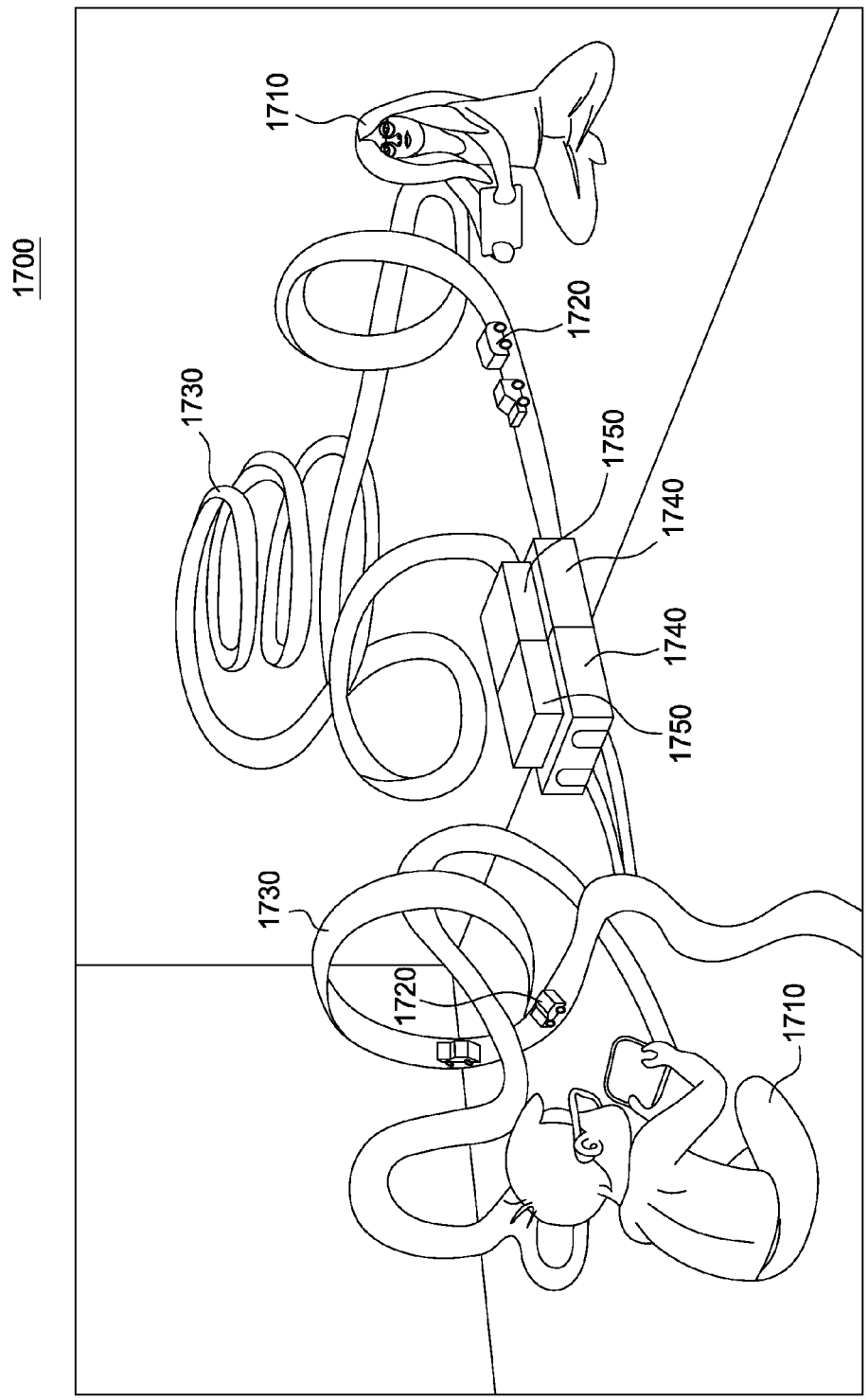
FIG. 17 illustrates a physical racetrack system interacting with a virtual racetrack depicting a remote user, according to one embodiment described herein.

An example of this is shown in FIG. 17, which is a screenshot of an interactive object interacting with a user and a remote interactive object, according to one embodiment described herein. Here, the screenshot 1700 depicts the user 1610, the Mater toy car 1620, race track 1630, tunnel unit 1640 and camera/projection unit 1650. As shown, the camera/projection unit 1650 is projecting frames onto the wall in the user's 1610 room. The frames depict Jill 1710, her interactive toy car 1720, race track 1730, tunnel unit 1740 and camera/projection unit 1750. For instance, the remote camera/projection unit 1750 could capture images of Jill and her environment, and could transmit (e.g., via a communications network) these images or data associated with these images to the project unit 1650. The camera/projection unit 1650 could then project frames depicting these images onto the wall in the user's 1610 room, thereby allowing the user 1610 to see and hear his friend Jill 1710 and her racing toy devices in real time.

Of note, although the camera/projection unit 1650 is shown atop the tunnel unit 1640, such a depiction is for illustrative purposes only and without limitation. More generally, the camera/projection unit 1650 can be positioned anywhere within the physical environment, or multiple camera/projection units 1650 could be positioned throughout the physical environment. Additionally, while the camera/projection unit 1650 includes both camera and projection functionality, separate devices (e.g., a camera device and a projection unit) could also be used to provide this functionality.

Additionally, although the screenshot 1700 depicts a projection unit 1650 configured to project a scene onto a surface (e.g., a wall), it is broadly contemplated that embodiments may utilize any display or visualization technology in lieu of or in addition to projection technology. Thus, while embodiments are descried herein using a projection unit(s), such a description is for illustrative purposes only and is without limitation. For example, a display device (e.g., a light-emitting diode (LED) television set) could display the remote environment, and could further be used to display rendered frames depicting the physical toy car 1620 moving into the virtual world. For example, when the toy car 1620 enters the tunnel unit 1640 and is hidden from the user's 1610 view, a virtual toy car could appear in a series of rendered frames displayed on the display device.

Embodiments may also combine physical interactive objects with augmented reality objects in order to create a completely immersive user experience. For example, when the user 1610 drives his Mater toy car 1620 into the tunnel unit 1640, an augmented reality version of the toy car 1620 could appear in the projection of Jill's environment. For example, the tunnel unit 1640 could be configured to capture the physical toy car 1620 when it enters the tunnel unit 1640. Additionally, the tunnel unit 1640 could be configured to reverse the direction and position of the toy car 1620, such that the toy car 1620 will exit the tunnel unit 1640 in the other lane and going the other direction when released.

Once the physical car 1620 is captured, the camera/projection unit 1650 could insert an augmented reality car into the rendered frames, depicting the Mater toy car 1620 driving on the remote race track 1630 in Jill's room. The virtual car could respond to Billy's 1610 input commands, in the exact same way that the physical toy car 1620 would respond to the input commands. Thus, from the user's 1610 perspective, it appears that the physical toy car 1620 has crossed over onto the remote race track 1630, in effect bridging the gap between the user's and his friend 1710 and allowing them to interact as if located within the same physical environment.

Furthermore, in such an example, an augmented reality version of the toy car 1620 could appear from Jill's 1710 perspective as well. For instance, assume that Jill 1710 is wearing a pair of augmented reality glasses. As another example, Jill could view the augmented reality car in her room using another augmented reality device, such as a phone with a camera (e.g., an iPhone or similar Android phone), or a tablet with a camera (e.g., an iPad). Upon detecting that the user's 1610 car 1620 has entered the tunnel unit 1640, Jill's augmented reality glasses (or, e.g., Jill's iPhone or iPad), could render an augmented reality version of Billy's car 1620 driving on Jill's race track 1730. In such an example, the augmented reality version of the car seen by Jill could appear to respond to Billy's commands. For instance, Billy 1610 could say "Watch this Jill, I'm going to drive Mater through the loop-de-loop!", and could control the augmented reality car as it moves through Jill's race track 1730.

When the augmented reality car drives into the tunnel unit 1740, the tunnel unit 1640 could be configured to release the physical Mater car 1620. Thus, the Mater car 1620 could appear to drive out of the tunnel unit 1640, at the precise time that the augmented reality car would have exited the tunnel unit based on its current speed and Billy's control of the car. As such, in this example, the interactive cars 1620 and 1720 will appear to the users 1610 and 1710 as if they can drive from one race track 1630 to the other race track 1730.

Figure 18:
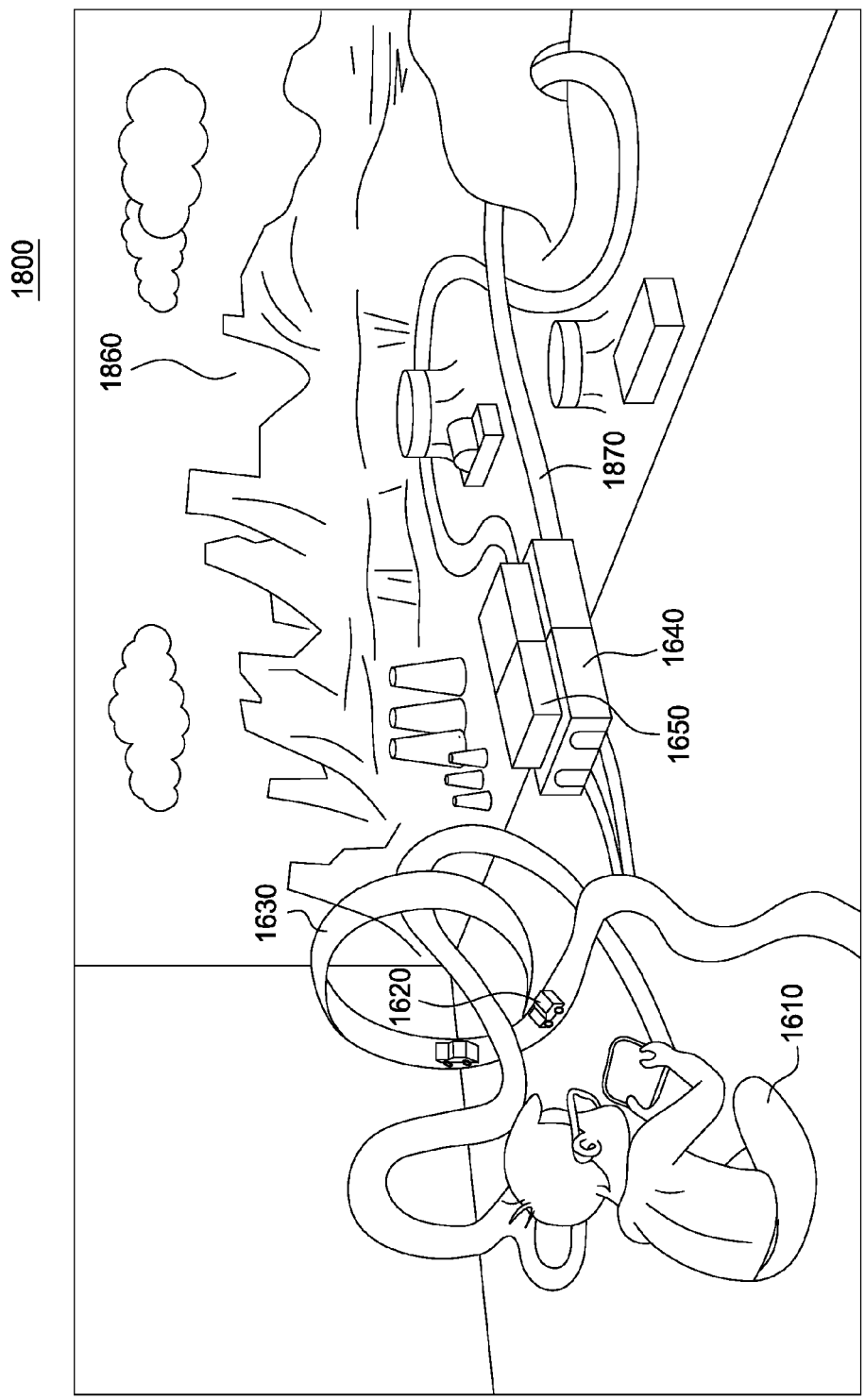
FIG. 18 illustrates a physical racetrack system interacting with a virtual racetrack, according to one embodiment described herein.

In one embodiment, the physical interactive objects may be combined with virtual objects in a virtual world. An example of this is shown in FIG. 18. Here, the screenshot 1800 depicts the user Billy 1610 again controlling his interactive Mater car 1620 around a racetrack 1630. Additionally, the screenshot 1800 includes a tunnel unit 1640 and a camera/projection unit 1650. In this example, the camera/projection unit 1650 is displaying a depiction of a virtual world 1860 which includes a virtual race track 1870.

When Billy 1610 drives the interactive Mater car 1620 into the tunnel unit 1640, the tunnel unit 1640 could again capture (and reverse) the physical car 1620. Furthermore, in this example, the projection unit 1650 could then render a virtual car exiting the virtual tunnel unit onto the virtual race track 1870. The virtual car could appear to respond directly to the user's 1610 controls, just as the physical Mater car 1620 would. When the virtual car drives back through the virtual tunnel, the physical tunnel unit 1640 could release the physical Mater car 1620, which could then exit the tunnel unit 1640 back onto the physical race track 1630.

Figure 19:
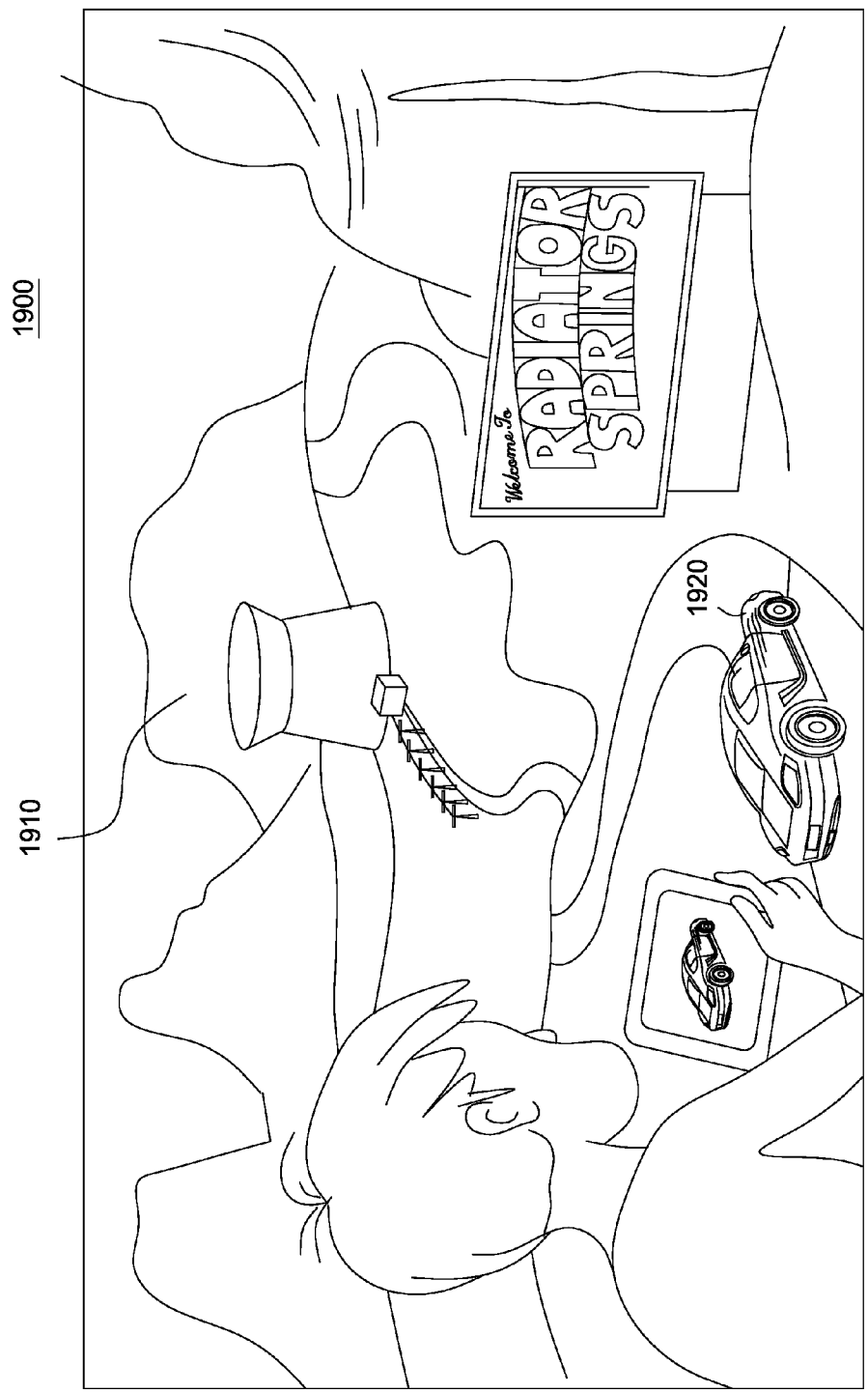
FIG. 19 illustrates a screenshot of a third person view of the virtual racetrack, according to one embodiment described herein.

In one embodiment, the projection of the virtual world 1860 changes perspectives once the physical car 1620 enters the virtual world (i.e., when the physical car 1620 enters and is captured by the tunnel unit 1640). For instance, the projection unit 1650 could alter the perspective from which the virtual world 1860 is viewed from, once the physical car 1620 enters the tunnel unit 1640. An example of this is shown in FIG. 19. Here, the screenshot 1900 shows a third-person view of a virtual Mater car 1920 driving through the virtual world 1910. As an example, the projection unit 1640 could be configured to render frames depicting the virtual camera (i.e., the virtual camera through which the virtual world is viewed) zooming in and changing perspectives within the virtual world, until the perspective shown in screenshot 1900 is depicted.

The user 1610 could then drive the virtual car 1920 through the virtual world 1910, until the virtual car 1920 reaches an exit point for the virtual world. At that time, the physical Mater car 1920 could be released from the tunnel unit 1640, once again under the control of the user 1610. Thus, from the user's perspective, the physical Mater car 1620 appears to be capable of entering and exiting the virtual world, thereby creating an immersive and interactive for the user.

Figure 20:
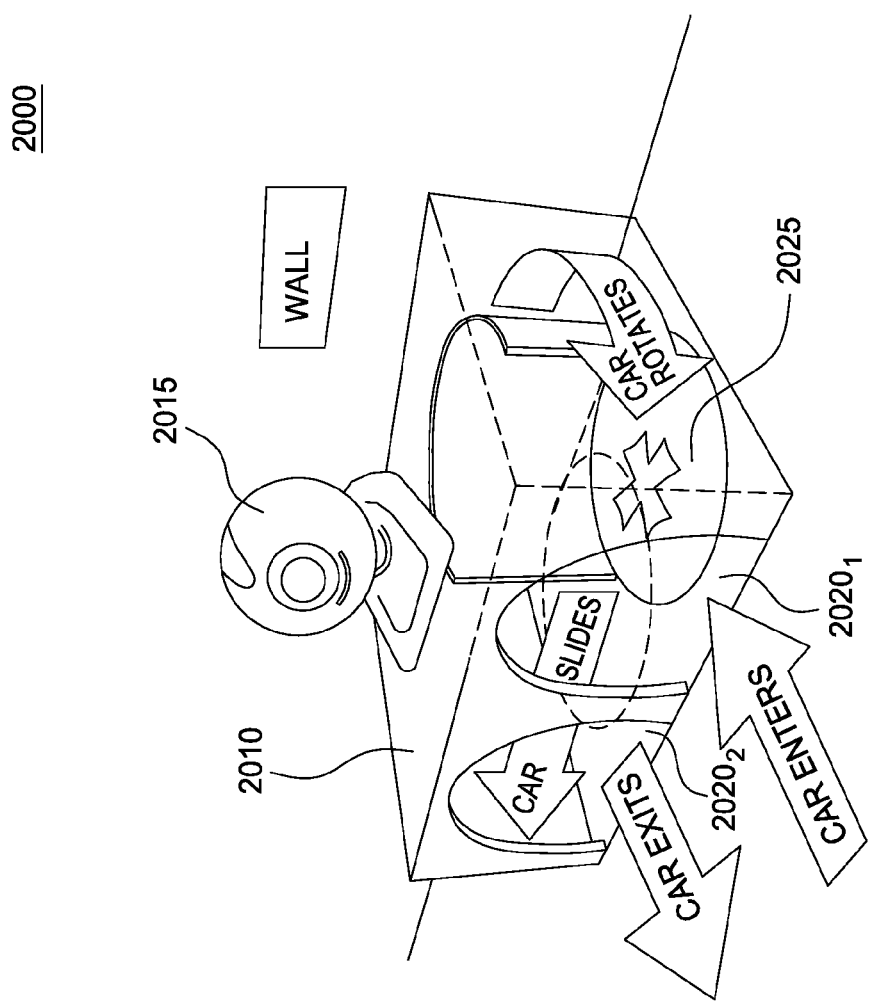
FIG. 20 illustrates a tunnel device, according to one embodiment described herein.

FIG. 20 illustrates a tunnel device, according to one embodiment described herein. As shown, the tunnel device 2000 includes a physical enclosure 2010, a projection device 2015, tunnel openings 2020 and a rotatable mechanism 2025. As discussed above, a toy vehicle (e.g., the car 1620) could enter and exit the tunnel openings 2020. For example, the toy vehicle could be configured to move along a physical racetrack, and sections of the racetrack could connect to each of the tunnel openings 2020, allowing the toy vehicle to enter the enclosure 2010. Upon a toy vehicle entering one of the tunnel openings 2020, logic within the enclosure 2010 could detect the presence of the toy vehicle and could activate the rotatable mechanism, rotating the car (e.g., 180 degrees) and sliding the car over to align with the second tunnel opening. For example, a toy vehicle could enter the tunnel opening $2020_1$, and the rotatable mechanism 2025 could be activated to rotate the toy car and to move the toy car into alignment with the tunnel opening $2020_2$. Doing so allows the toy car to exit the tunnel opening $2020_2$, e.g., onto the physical race track.

As discussed above, the tunnel device 2000 may be used to simulate interactions between the physical world and a virtual world. For example, a toy care could enter the enclosure 2010 via the tunnel opening 2020₁, and in response, the projection unit 2015 could project a series of rendered frames depicting a virtual car exiting a rear side of the enclosure 2010. Inputs from a control device, previously used to control the physical toy car, could then be used to control the virtual car within the virtual world (e.g., as the virtual car drives along a virtual race track). Additionally, the rotatable device 2025 could maneuver the physical toy car so that the physical car is aligned with the tunnel opening 2020₂. Upon detecting that the virtual car has reached a predefined location within the virtual world (e.g., an area of the virtual track that is projected at a location proximate to the rear of the enclosure 2010), the rendered frames could depict the virtual car disappearing into a virtual tunnel, and the physical toy car could exit the tunnel opening 2020₂. Doing so creates the appearance that the physical toy car can enter and exit the virtual world.

Figure 21:
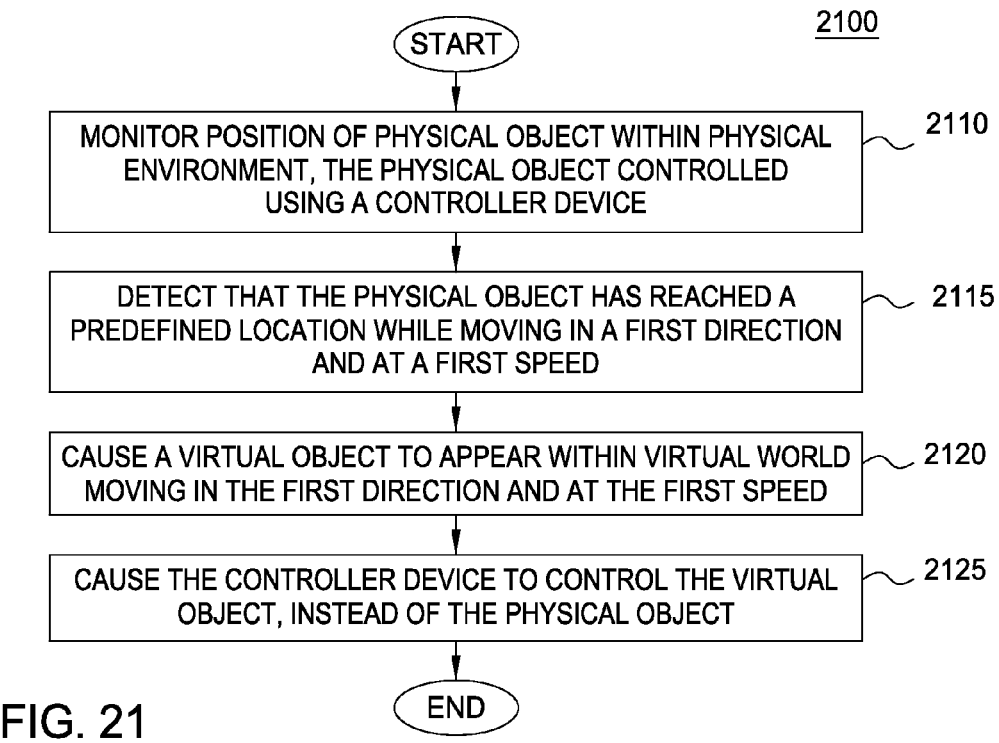
FIG. 21 is a flow diagram illustrating a method of simulating a physical-to-virtual interaction, according to one embodiment described herein.

FIG. 21 is a flow diagram illustrating a method of managing physical world to virtual world interactions, according to one embodiment described herein. As shown, the method 2100 begins at block 2110, where a control component monitors a position of a physical object within a physical environment. Here, movement of the physical object is being controlled using a controller device. For example, in one embodiment the controller device comprises a radio frequency (RF) hand-held device. In a particular embodiment, the controller device comprises an application executing on a mobile device. More generally, however, any device capable of providing input for controlling an aspect of an object (e.g., movement of a physical and/or a virtual object) may be used, consistent with the present disclosure.

Here, the control component could monitor the physical object's position using a variety of different techniques. For example, one or more sensors (e.g., an infrared or laser-based motion detection sensor) could be positioned around a physical race track, where the sensors are configured to detect when the physical object passes a particular portion of the track. In one embodiment, a sensor is positioned within the enclosure 2010 of the tunnel apparatus 2000 and is configured to detect when a toy vehicle enters the enclosure 2010 through one of the tunnel openings 2020.

At some point, the control component then detects that the physical object has reached a predefined location, while the object was moving in a first direction and at a first speed (block 2115). In one embodiment, the control component is configured to monitor the physical object's direction and speed (e.g., based on the inputs of the controller device, based on data reported by the physical object, etc.). In a particular embodiment, the control component is configured to infer the object's direction and speed. For example, in one embodiment the physical object is a toy car configured to move only in a particular directly (e.g., clockwise) around a track at a predefined speed. As such, the control component in such an embodiment could infer that the vehicle was travelling in the particular direction and at the predefined speed, when the vehicle reaches the predefined location.

Upon detecting the physical object has reached the predefined location, the control component causes a virtual object to appear within a virtual world, moving in the first direction and at the first speed (block 2120). For example, the control component could render a series of frames depicting a virtual car moving along a virtual road responsive to control inputs from the controller device, and could output the series of frames for display (e.g., using projection device 2015). The control component also causes the inputs received from the controller device to affect the virtual object, as opposed to the physical object (block 2125), and the method 2100 ends. For instance, a physical toy car could be held stationary within the tunnel enclosure 2010, while the inputs from the controller device could be used to affect the behavior of the virtual car within the rendered series of frames. Advantageously, doing so provides the illusion that the physical toy car has travelled from the physical environment into the virtual world.

Figure 22:
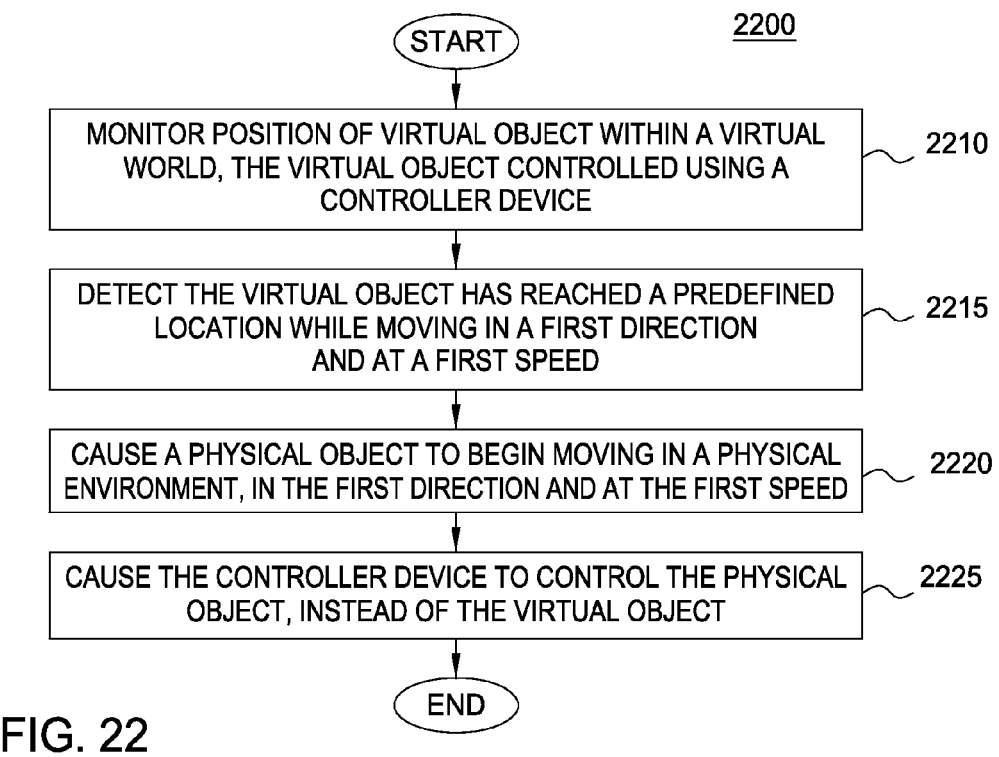
FIG. 22 is a flow diagram illustrating a method of simulating a virtual-to-physical interaction, according to one embodiment described herein.

In addition to simulating physical-to-virtual interactions, the control component can also be configured to simulate virtual-to-physical interactions. An example of this is shown in FIG. 22, which is a flow diagram illustrating a method of simulating virtual world to physical world interactions, according to one embodiment described herein. As shown, the method 2200 begins at block 2210, where a control component monitors a position of a virtual object within a virtual world. Here, the virtual object is controlled using a controller device (e.g., a control device coupled to a control system, a RF control device, an application executing on a mobile device, etc.). Thus, for example, the virtual object could be a virtual race car that is actively being controlled by a user using a controller device coupled to a gaming console executing the control component.

At some point, the control component detects that the virtual object has reached a predefined location within the virtual world (block 2215). For example, in the screenshot 1800, the control component could detect when the virtual car has reached the virtual tunnel that is coupled to the physical tunnel apparatus 1640. In response, the control component could cause a physical object to begin moving within the physical environment, based on the direction and speed at which the virtual car was moving within the virtual environment (block 2220). For example, the physical toy vehicle could exit the tunnel enclosure 1640, shortly after the virtual car entered the virtual tunnel enclosure. Preferably, in such an embodiment, the physical toy vehicle should exit the physical tunnel enclosure 1640 at a moment in time based on the virtual car's speed, such that it appears the physical car exiting the tunnel enclosure 1640 is the same vehicle as the virtual car. Thus, for example, if the virtual car is travelling at a high rate of speed, the physical toy car should exit the tunnel shortly after the virtual car enters the virtual tunnel, while a longer delay before the physical car exits the tunnel enclosure 1640 could be used for a virtual car travelling at a relatively low rate of speed.

Additionally, the control component causes the controller device that was controlling the virtual car to control the behavior of the physical object (block 2225), and the method 2200 ends. As discussed above, examples of the controller device include a locally controlled device operated by a user in the same physical environment as the physical toy car, and a remote controller device (e.g., controlled by a remote user) located in a remote physical location, e.g., during a video-conferencing play session. Advantageously, doing so provides the illusion of the virtual object (e.g., the virtual car) appearing in the physical world (e.g., as the physical toy car exiting the tunnel), and provides a seamless integration between the virtual and physical worlds and between physical locations during a remote play session.

Of note, while some examples are provided herein involving a toy car and race track, more generally the techniques for managing virtual-to-physical and physical-to-virtual interactions can be used in a variety of different contexts. For example, one embodiment provides a game (e.g., shuffleboard) in which a user in a physical environment plays against an animated, graphical, computer-generated character. For example, a portion of the play surface for the game could be a physical object, while the remaining portion of the play surface could be a virtual object that exists in the virtual world. Thus, in a shuffleboard style game, the user could play a game against the virtual character in which the user slides a physical object (e.g., a puck) slides along a flat play surface made up of both physical and virtual portions. For instance, the physical puck could slide into a physical slot where it is captured. In response, a virtual depiction of the physical puck could appear within the virtual world, e.g., having the same velocity as the physical puck. A score could then be determined, depending upon where within the virtual world the virtual puck lands.

As another example, an air hockey game could be played in which a portion of the table is within the physical world, and a remaining portion is within the virtual world. In such an example, a user could launch a physical puck, which could eventually be captured within a slot on the physical table. In response, a virtual depiction of the puck could appear within the virtual world, having the same velocity as the physical puck. A virtual character could then attempt to hit the virtual puck (e.g., the success of such a hit could be determined according to game logic), and if successful, could send the virtual puck back towards the user. When the virtual puck nears the slot within the physical table, the physical puck could be ejected towards the user in the appropriate place based on the position of the virtual puck, and having a velocity of the virtual puck.

CONCLUSION

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   monitoring a position of a physical object to detect when the physical object reaches a predefined location on a rotatable mechanism within a physical enclosure within the physical environment, wherein the physical object is moving in a first direction and at a first speed within the physical environment, and wherein the rotatable mechanism, when actuated, rotates along a first axis;
   upon detecting the physical object has reached the predefined location:
      causing a virtual depiction of the physical object to appear within a virtual world, such that the virtual depiction of the physical object is moving in the first direction and at the first speed within the virtual world; and
      activating the rotatable mechanism to rotate, along the first axis, moving the physical object from a first orientation to a second orientation; and
   upon detecting the virtual depiction of the physical object has reached a predefined location within the virtual world while travelling in a second direction and at a second speed, causing the physical object to move within the physical environment, starting from the second orientation, in the second direction and at the second speed.

2. The method of claim 1, wherein causing a virtual depiction of the physical object to appear within a virtual world further comprises:
   rendering a series of frames including the virtual depiction of the physical object moving in the first direction and at the first speed within the virtual world; and
   projecting the rendered series of frames onto a surface for display.

3. The method of claim 1, wherein the physical object comprises a toy vehicle, wherein the toy vehicle is configured to move along a physical race track, and wherein the rotatable mechanism is configured to rotate the toy vehicle from a first part of the physical race track to a second part of the physical race track.

4. The method of claim 3, wherein the depiction of the physical object comprises a virtual vehicle, and wherein the virtual vehicle is configured to move along a virtual race track.

5. The method of claim 1, wherein monitoring a position of a physical object to detect when the physical object reaches a predefined location within a physical environment further comprising:
   receiving a notification indicating that the physical object has passed a first sensor device.

6. The method of claim 1, further comprising:
   controlling movement of the physical object based on one or more inputs to a controller device;
   upon detecting the physical object has reached the predefined location, controlling movement of the virtual depiction of the physical object within the virtual world, based on inputs to the controller device.

7. A method, comprising:
   monitoring a position of a virtual object to detect when the virtual object reaches a predefined location within a virtual world, wherein the virtual object is moving in a first direction and at a first speed within the virtual world
   transmitting one or more instructions to actuate a rotatable mechanism to rotate, along the first axis, thereby rotating a physical object substantially atop the rotatable mechanism from a first orientation to a second orientation; and
   upon detecting the virtual object has reached the predefined location, causing the physical object to begin moving in the first direction and at the first speed within a physical environment.

8. The method of claim 7, further comprising:
   upon detecting the physical object has reached a predefined location within the physical environment while travelling in a second direction and at a second speed, causing the virtual object to move within the virtual world in the second direction and at the second speed.

9. The method of claim 7, wherein the physical object comprises a toy vehicle, wherein the toy vehicle is configured to move along a physical race track, and wherein the rotatable mechanism is configured to rotate the toy vehicle from a first part of the physical race track to a second part of the physical race track.

10. The method of claim 9, wherein the depiction of the physical object comprises a virtual vehicle, and wherein the virtual vehicle is configured to move along a virtual race track.

11. The method of claim 7, further comprising:
   controlling movement of the physical object based on one or more inputs to a controller device;
   upon detecting the physical object has reached the predefined location, controlling movement of the virtual depiction of the physical object within the virtual world, based on inputs to the controller device.

\* \* \* \* \*